(12) United States Patent
Noguchi

(10) Patent No.: US 7,791,658 B2
(45) Date of Patent: Sep. 7, 2010

(54) ANALOG FRONT END TIMING GENERATOR (AFE/TG) HAVING A BIT SLICE OUTPUT MODE

(75) Inventor: Yasu Noguchi, Sunnyvale, CA (US)

(73) Assignee: Media Tek Singapore Pte Ltd., Singapore (SG)

( * ) Notice: Subject to any disclaimer, the term of this patent is extended or adjusted under 35 U.S.C. 154(b) by 1026 days.

(21) Appl. No.: 11/044,379

(22) Filed: Jan. 27, 2005

(65) Prior Publication Data
US 2006/0077276 A1 Apr. 13, 2006

Related U.S. Application Data

(63) Continuation-in-part of application No. 10/963,494, filed on Oct. 11, 2004.

(51) Int. Cl.
H04N 9/09 (2006.01)
(52) U.S. Cl. .................................. 348/265; 348/312
(58) Field of Classification Search ............. 348/222.1, 348/263, 265, 148, 312; 341/141; 359/464; 717/143; 345/546, 605
See application file for complete search history.

(56) References Cited

U.S. PATENT DOCUMENTS

| 5,313,231 | A * | 5/1994 | Yin et al. ..................... 345/605 |
| 5,502,837 | A * | 3/1996 | Hoffert ........................ 713/400 |
| 5,874,909 | A * | 2/1999 | Soenen et al. ................ 341/141 |
| 6,734,866 | B1 * | 5/2004 | Dotson ........................ 345/546 |
| 7,019,777 | B2 * | 3/2006 | Sun ............................. 348/263 |
| 2004/0032493 | A1 * | 2/2004 | Franke et al. ................ 348/148 |
| 2004/0218269 | A1 * | 11/2004 | Divelbiss et al. ............ 359/464 |
| 2008/0320454 | A1 * | 12/2008 | Suzuki et al. ................ 717/143 |

FOREIGN PATENT DOCUMENTS

| JP | 07-250288 | 10/1994 |
| JP | 09-312810 | 5/1996 |
| JP | 2002-261264 | 9/2002 |

(Continued)

OTHER PUBLICATIONS

"LM9801 8-Bit Greyscale/24-Bit Color Linear CCD Sensor Processor", National Semiconductor, 1996.*

(Continued)

Primary Examiner—Jason Whipkey
Assistant Examiner—Dennis Hogue
(74) Attorney, Agent, or Firm—Imperium Patent Works

(57) ABSTRACT

A versatile analog front end and timing generator (AFE/TG) integrated circuit has output modes wherein multiple identical AFE/TGs output digitized sensor data to a single digital image processor (DIP) without intervening discrete multiplexing circuitry. In one embodiment, the AFE/TG is operable in either a bit slice mode or a time slice mode. In the bit slice mode, each of the multiple AFE/TGs sections up a word of pixel information into subsets of bits, and then communicates the subsets in parallel, one subset after another, across point-to-point connections to corresponding terminals of the DIP. The DIP captures the subsets of bits, and reassembles the subsets to recreate the word of pixel information. Each of the multiple AFE/TGs communicates words of pixel information to a different set of terminals on the DIP in this way, thereby avoiding timing complications, loading and/or expense associated with communicating the pixel information using time multiplexing techniques.

17 Claims, 20 Drawing Sheets

FOREIGN PATENT DOCUMENTS

WO      WO 03/088653 A1    4/2002

OTHER PUBLICATIONS

"ICM205B VGA/QVGA CMOS image sensor with digital YUV output Data Sheet V1.3," IC Media, Oct. 2002.*

"Vision VV6300 Low Resolution Digital CMOS Image Sensor", VLSI Vision Limited, Mar. 4, 1998.*

"Exar XRD9814/XRD9816 3 Channel 14/16 Bit Linear CCD/CIS Sensor Signal Processors", EXAR Corporation, Dec. 1999.*

* cited by examiner

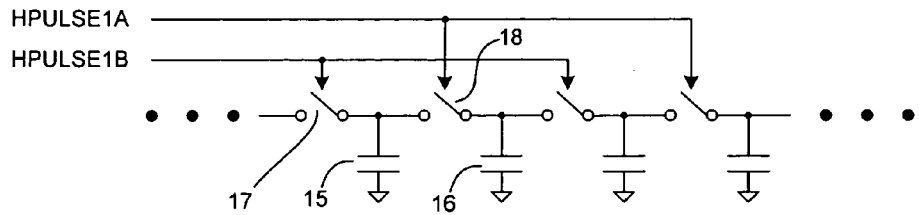
FIG. 3
(PRIOR ART)
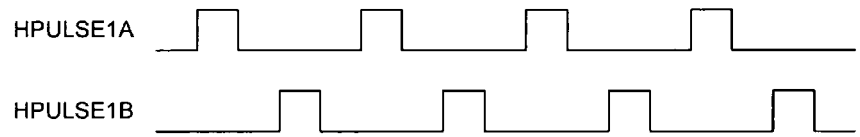
FIG. 4
(PRIOR ART)
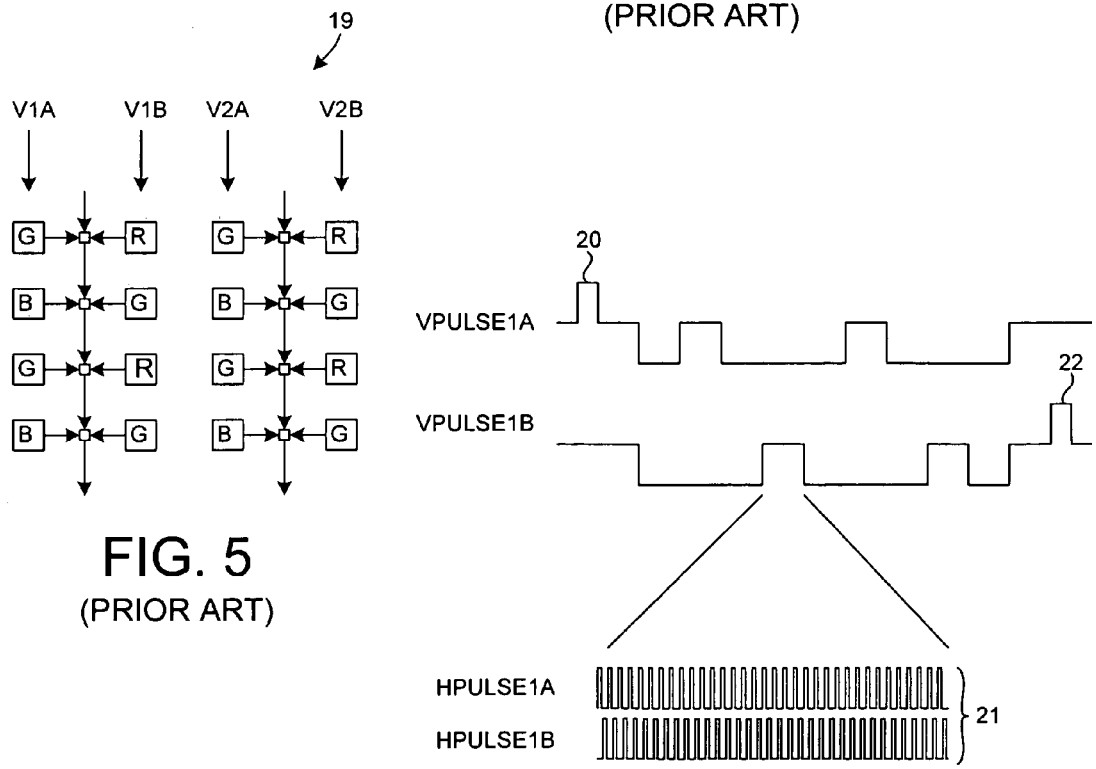
FIG. 5
(PRIOR ART)
FIG. 6
(PRIOR ART)

HIGH SPEED READOUT MODE

```
#include      "TG.h"     // define constant parameters, etc.

main()
{
    until(AUX0[2]);      // Wait for INIT_EN flag.
                         // This instruction should be
                         // coded into initial code register.

init:                // The following register setup can be
                         // carried out through simple DBE register write
                         // (to SPi, AUX2 and GPi directly).
                         // This is an example to show it could also
                         // be done by the PSG.

// set H signal ranges reg.
        GP3 = (48<<6) | (63);    // set RG range, set at 48, reset at 63
        SP3 = GP3;
        GP3 = (0<<6) | (31);     // set ADCLK range, set at 0, reset at 31
        SP2 = GP3;
200 → GP3 = (47<<6) | (16);     // set H1A/H1B range, set at 47, reset at 16
201 → SP1 = GP3;
        GP3 = (16<<6) | (47);    // set H2A/H2B range, set at 16, reset at 47
        SP0 = GP3;

GP3 = (15<<6) | (0);     // set XSHP range, set at 15, reset at 0
        SPa = GP3;
        GP3 = (47<<6) | (32);    // set XSHD range, set at 47, reset at 32
        SPb = GP3;

// set H enable reg.
        AUX3 ^= AUX3;

// set default V signal values
        GP0 = 1<<8 | 1<<6 | 1<<5 | 1<<2 | 1<<1 | 1<<0;
        GP1 = 1<<6;

done;
    last: nop;
}
```

FIG. 16A

```
#define    H2     (1<<0)
#define    H1     (1<<1)
#define    ADCLK  (1<<2)
#define    RG     (1<<3)
#define    XSHP   (1<<10)
#define    XSHD   (1<<11)

#define    V1     (1<<0)
#define    V3A    (1<<1)
#define    V3B    (1<<2)
#define    V5A    (1<<3)
#define    V5B    (1<<4)
#define    V2     (1<<5)
#define    V4     (1<<6)
#define    V6     (1<<7)
#define    HD     (1<<8)

#define    SUB    (1<<5)
#define    VD     (1<<6)
```

202 → main()
{

203 →   until(AUX0[0]);    // wait for P_EN flag
                           // This instruction should be
                           // coded into initial code register.

204 →   GP3 = ADCLK|H1|H2|RG|XSHP|XSHD;  // enable H signals
205 →   AUX3 |= GP3;
                  // all above can be pre-set by DBE // Regular CCD/CMOS sensors flush can be added later.
        // Assume all the signals are with their default values
        // such as insert a separate flush frame before the normal P.

line_1:
206 →     GP0 ^= VD;        // set VD
207 →     call dataout_line;  // line 1, dummy line
          nop;

line_2:
          nop;
          nop;
209 →     call readout_line;  // line 2
214 →     RGP3 = 6;           // line cnt line_3_9:
          nop;
          nop;
216 →     call dataout_line;  // line 3-9
215 →     while(RGP3--) goto line_3_9;

FIG. 16B

```
                line_10:
                    nop;
217 →               GP0 ^= VD;          // reset VD
                    call dataout_line;  // line 10
                    RGP3 = 213;         // line cnt line_11_224:
                    nop;
                    nop;
                    call dataout_line;  // line 11-224
                    while(RGP3--) goto line_11_224;

218 →           if (AUX0[0]) goto line_1; // jump back to preview if
                                       // P_EN is not cleared by DBE
                    done;              // done if P_EN is cleared /////////////////////////////
                ///// subroutines
                /////////////////////////////

208 →           dataout_line:
                    // pixel readout part
                    GP1 ^= HD;          // at 0, set HD(HR)
211 →               delay(42);          // at 1
212 →               AUX3 ^= (H1^H2);    // at 43, reset H1/H2, will take effect at 44
                    GP0 ^= (V5A^V5B);   // at 44, set V5
                    delay(25);          // at 45
                    GP0 ^= V1;          // at 70, set V1
                    delay(25);          // at 71
                    GP0 ^= V6;          // at 96, set V6
                    delay(25);          // at 97
                    GP0 ^= V2;          // at 122, set V2
                    delay(25);          // at 123
                    GP0 ^= V1;          // at 148, reset V1
                    delay(25);          // at 149
                    GP0 ^= (V3A^V3B);   // at 174, set V3A/V3B
                    delay(25);          // at 175
                    GP0 ^= (V2^HD);     // at 200, reset V2, HD delay(25);          // at 201
                    GP0 ^= V4;          // at 226, set V4
                    delay(25);          // at 227
                    GP0 ^= (V3A^V3B);   // at 252, reset V3A/V3B
                    delay(25);          // at 253
                    GP0 ^= (V5A^V5B);   // at 278, reset V5
                    delay(25);          // at 279
                    GP0 ^= V4;          // at 304, reset V4
                    delay(25);          // at 305
                    GP0 ^= V6;          // at 330, reset V6
                    delay(25);          // at 331
                    GP0 ^= (V5A^V5B);   // at 356, set V5
                    delay(25);          // at 357
```

FIG. 16C

```
            GP0 ^= V1;        // at 382, set V1
                delay(25);        // at 383
                GP0 ^= V6;        // at 408, set V6
                delay(7);         // at 409
                GP1 ^= SUB;       // at 416, set SUB
                delay(17);        // at 417
                GP0 ^= V2;        // at 434, set V2
                delay(25);        // at 435
                GP0 ^= V1;        // at 460, reset V1
                delay(25);        // at 461
                GP0 ^= (V3A^V3B); // at 486, set V3A/V3B
                delay(17);        // at 487
                GP1 ^= SUB;       // at 504, reset SUB
                delay(7);         // at 505
                GP0 ^= V2;        // at 512, reset V2
                delay(25);        // at 513
                GP0 ^= V4;        // at 538, set V4
                delay(25);        // at 539
                GP0 ^= (V3A^V3B); // at 564, reset V3A/V3B
                delay(25);        // at 565
                GP0 ^= (V5A^V5B); // at 590, reset V5
                delay(25);        // at 591
                GP0 ^= V4;        // at 616, reset V4
                delay(25);        // at 617
                GP0 ^= V6;        // at 642, reset V6
                delay(25);        // at 643
                GP0 ^= (V5A^V5B); // at 668, set V5
                delay(25);        // at 669
                GP0 ^= V1;        // at 694, set V1
                delay(25);        // at 695
                GP0 ^= V6;        // at 720, set V6
                delay(25);        // at 721
                GP0 ^= V2;        // at 746, set V2
                delay(25);        // at 747
                GP0 ^= V1;        // at 772, reset V1
                delay(25);        // at 773
                GP0 ^= (V3A^V3B); // at 798, set V3A/V3B
                delay(25);        // at 799
                GP0 ^= V2;        // at 824, reset V2
                delay(25);        // at 825
                GP0 ^= V4;        // at 850, set V4
                delay(25);        // at 851
                GP0 ^= (V3A^V3B); // at 876, reset V3A/V3B
                delay(25);        // at 877
                GP0 ^= (V5A^V5B); // at 902, reset V5
                delay(25);        // at 903
                GP0 ^= V4;        // at 928, reset V4
                delay(25);        // at 929
                GP0 ^= V6;        // at 954, reset V6
                delay(24);        // at 955
213 →           AUX3 ^= (H1^H2); // at 979, set H1/H2, will take effect at 980
```

FIG. 16D

```
            // final delay
                GP3 = 2645;      // at 980
                while (GP3--);
                return;          // at 3627, leave 4 cycles for other op.

219 →   readout_line:
                // CCD readout part
                GP1 ^= HD;       // at 0, set HD(HR)
                GP3 = 197;       // at 1
                while (GP3--);
                GP0 ^= HD;       // at 200, reset HD
                GP3 = 1885;      // at 201
                while (GP3--);
                GP0 ^= (V5A^V5B);// at 2088, set V5
                delay(26);       // at 2089
                GP0 ^= V1;       // at 2115, set V1
                delay(28);       // at 2116
                GP0 ^= V6;       // at 2144, set V6
                delay(55);       // at 2145
                GP1 ^= V3A;      // at 2200, set V3A_T
                delay(41);       // at 2201
                GP0 ^= V2;       // at 2242, set V2
                delay(40);       // at 2243
                GP1 ^= V3A;      // at 2283, reset V3A_T
                delay(41);       // at 2284
                GP0 ^= V1;       // at 2325, reset V1
                delay(27);       // at 2326
                GP0 ^= (V3A^V3B);// at 2353, reset V3A/V3B
                delay(27);       // at 2354
                GP0 ^= V2;       // at 2381, reset V2
                delay(58);       // at 2382
                GP1 ^= V5A;      // at 2440, set V5A_T
                delay(41);       // at 2441
                GP0 ^= V4;       // at 2482, set V4
                delay(40);       // at 2483
                GP1 ^= V5A;      // at 2523, reset V5A_T
                delay(69);       // at 2524
                GP0 ^= (V3A^V3B);// at 2593, reset V3A/V3B
                delay(26);       // at 2594
                GP0 ^= (V5A^V5B);// at 2620, reset V5
                delay(28);       // at 2621
                GP0 ^= V4;       // at 2649, reset V4
                delay(26);       // at 2650
                GP0 ^= V6;       // at 2676, reset V6

// final delay

GP3 = 948;   // at 2677
                while (GP3--);
                return;          // at 3627, leave 4 cycles for other op.

last: nop;

}
```

| FIG. 14A |
|----------|
| FIG. 16B |
| FIG. 16C |
| FIG. 16D |
| FIG. 16E |

KEY TO
FIG. 16

FIG. 16E

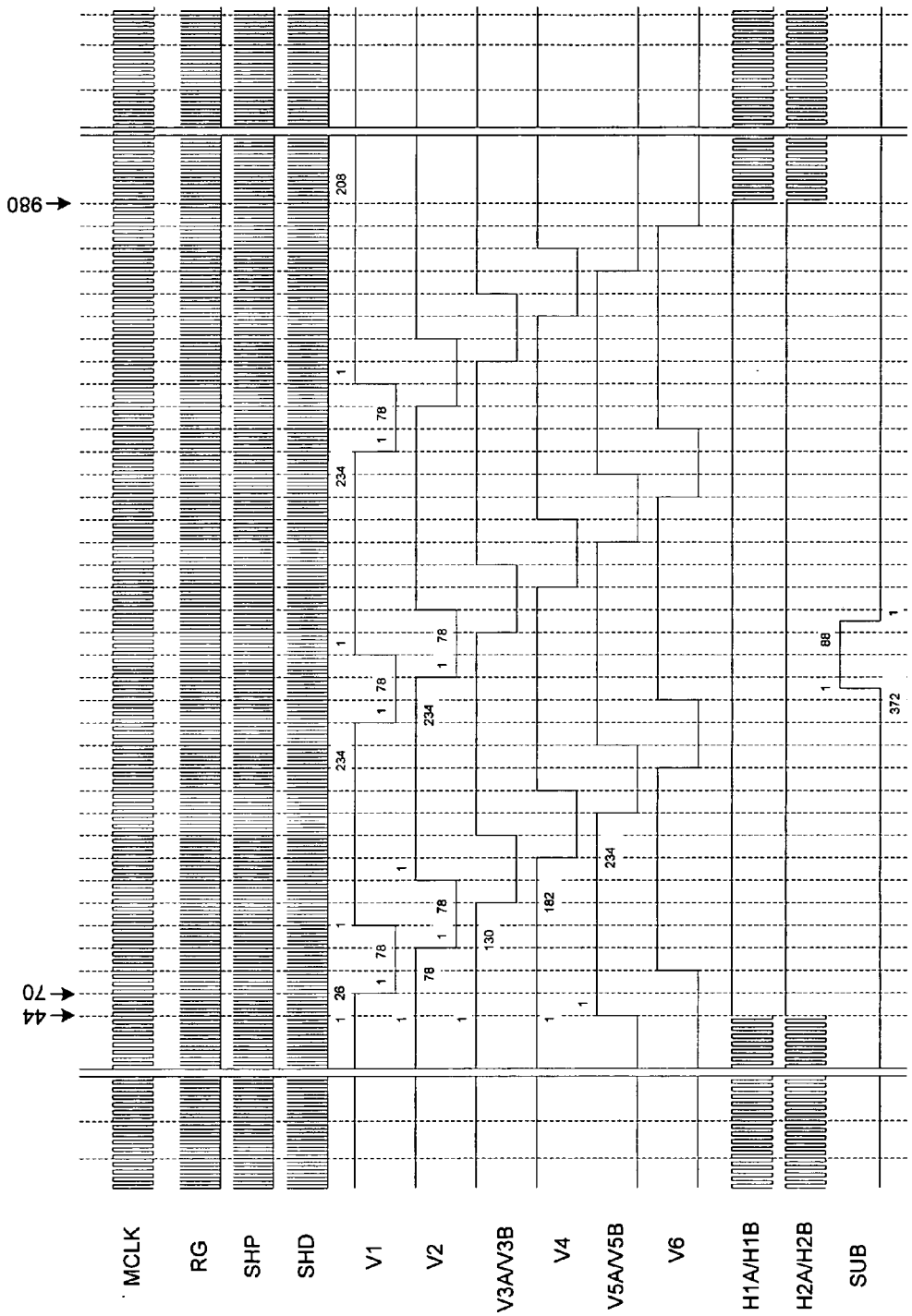
FIG. 17 HIGH FRAME RATE DATA OUT MODE

BIT SLICE 3 AFE MODE

TIME SLICE 3 AFE MODE

| TYPE OF CONFIGURATION | NO BITS | SINGLE CCD | DUAL CCD (2 AFE/TG MODES) | | | | 3 CCD (3 AFE/TG MODES) | | | | | |
|---|---|---|---|---|---|---|---|---|---|---|---|---|
| | | | TIME SLICE | | BIT SLICE | | TIME SLICE | | | BIT SLICE | | |
| | | | MASTER | SLAVE | MASTER | SLAVE | MASTER | SLAVE 1 | SLAVE 2 | MASTER | SLAVE 1 | SLAVE 2 |
| MASTER/SLAVE BIT | 1 | X | 1 | 0 | X | X | 1 | 0 | 0 | X | X | X |
| MODE CONTROL BITS | 4 | 1XXX | 0110 | 0010 | 0100 | 0000 | 0111 | 0011 | 0011 | 0101 | 0001 | 0001 |

SINGLE CCD / NOT SINGLE CCD
MASTER / SLAVE
TIME SLICE / BIT SLICE
3 CCD / NOT 3 CCD

FIG. 23

ANALOG FRONT END TIMING GENERATOR (AFE/TG) HAVING A BIT SLICE OUTPUT MODE

CROSS-REFERENCE TO RELATED APPLICATION

The present application is a continuation-in-part of and claims the benefit under 35 U.S.C. §120 of U.S. patent application Ser. No. 10/963,494, filed Oct. 11, 2004 (the subject matter of which is incorporated herein by reference).

TECHNICAL FIELD

The present invention relates to timing generators that supply timing signals to image sensors, and also relates to communications between an analog front end timing generator (AFE/TG) integrated circuit and a digital image processing (DIP) integrated circuit.

BACKGROUND

FIG. 1 (Prior Art) is a simplified diagram of a consumer market digital still camera 1. An image passes through lens 2 and is captured by an image sensor 3. Image sensor 3 may, for example, be a charge coupled device (CCD) sensor or a CMOS sensor or another type of sensor. In the present example, the sensor is a CCD sensor. An analog front end (AFE) and timing generator (TG) integrated circuit 4 supplies vertical pulse signals (VPULSE signals) and horizontal pulse signals (HPULSE signals) to sensor 3 such that the sensor data (CCD OUT) is read out of the sensor and is transferred to the AFE/TG 4. CCD sensor 3 requires vertical pulse signals whose voltage minimums and voltage maximums are outside the voltage range that can be supplied by the AFE/TG integrated circuit. The vertical pulse signals VPULSE output from the AFE/TG integrated circuit are therefore supplied to a vertical driver 5 that performs level shifting to the voltage levels required by the CCD sensor 3.

AFE/TG integrated circuit 4 digitizes the image data received from the sensor and passes the digitized image data to a digital image processing (DIP) integrated circuit 6. The digitized image data is denoted DOUT. DIP 6 performs image processing on the image data and then typically stores the image in digital form in mass storage 7. The information may, for example, be stored as a digital file. DIP 6 also causes the image to be displayed on a display 8. A microcontroller 9 provides overall key scanning, control and configuration functions for the camera. Microcontroller 9 is coupled to DIP 6 via a serial bus. Microcontroller 9 controls lens 2 via motor driver circuitry 10.

FIG. 2 (Prior Art) is a simplified diagram of a primitive CCD image sensor 11. CCD image sensor 11 includes a two-dimensional array of sensors. In the illustration, the sensors are denoted as squares, where each square contains a letter. A square that contains a "G" is a sensor for green. A square that contains an "R" is a sensor for red. A square that contains a "B" is a sensor for blue. Reference numeral 12 identifies one such sensor for green. In response to a shutter signal, each of the sensors takes a sample. The sample is retained in the sensor in the form of a charge. The magnitude of the charge indicates the sample value. The charge values are read out of CCD sensor 11 in serial fashion by supplying horizontal pulse signals and vertical pulse signals to the CCD sensor. Each sensor has an associated storage element located to its left. Reference numeral 13 identifies the storage element for sensor 12. At one time, the sample charges from all the sensors are transferred right to left into the associated storage elements. A vertical pulse signal is then applied to CCD sensor 11. This causes the sample charge in each storage element to be shifted down to the storage element below it. The sample charge in the bottom-most row of storage elements passes into a row 14 of storage elements at the bottom of the sensor. Once this row 14 contains a set of charges, a plurality of horizontal pulses is applied to CCD sensor 11. These horizontal pulses cause the sample charges in the storage elements of row 14 to be shifted out of the CCD sensor one-by-one. When the complete row of sample charges has been shifted out of CCD sensor 11, then another vertical pulse is applied to load row 14 with the next row of sample charges to be read out. This process of supplying a vertical pulse, and then shifting out the bottom row of sample charges is repeated until all the sample charges are read out of CCD sensor 11.

FIG. 3 (Prior Art) is a simplified diagram that illustrates an operation of row 14 of storage elements. To transfer a charge from storage element 15 to storage element 16, switch 17 is opened and switch 18 is closed. This allows charge from storage element 15 to pass through conductive switch 18 and into storage element 16. It is therefore seen that adjacent switches in the row are opened and closed in alternating fashion to shift a sample charge down the row of storage elements. It is to be understood that FIG. 3 is a very simplified diagram presented here for background information.

FIG. 4 (Prior Art) illustrates the alternating fashion of pulses in the two horizontal pulse signals HPULSE1A and HPULSE1B that control the row of switches of FIG. 3.

FIG. 5 (Prior Art) is a simplified diagram of a slightly more complex CCD sensor 19. In CCD sensor 19, each successive pair of columns of sensors shares a column of storage elements. Columns V1A and V1B share one column of storage elements. Columns V2A and V2B share a second column of storage elements.

FIG. 6 (Prior Art) illustrates the vertical pulse signals VPULSE1A and VPULSE1B used to read the sensor samples out of the array. First, the left column of sensors of each successive pair of columns is to be read out. The right column of sensors of each pair is not read out. The initial high pulse 20 of VPULSE1A with no such high pulse of VPULSE1B indicates that the left column of sensors is to transfer a column of sample charges to the center column of storage elements. Once this transfer occurs, the VPULSE1A and VPULSE1B alternate as in FIG. 4 to shift the sample charges down in the vertical dimension. After each such vertical shift, a complete set 21 of horizontal shift pulses of HPUSEL1A and HPULSE1B shifts out the bottom row of storage elements of the sensor.

Once this left half of the image frame has been shifted out, then a high pulse 22 on VPULUSE1B causes the right column of sensors of each pair of sensor columns to transfer their sample charges to the shared column of storage elements. The process repeats with each vertical shift being followed by a set 21 of horizontal shift pulses. In this way, sample charges from sensors in the right column of each pair of sensor columns is read out of CCD sensor 19. It is therefore seen that more complex vertical and horizontal shift pulses are required for a CCD sensor having such shared columns of storage elements.

The state of the art in CCD image sensors has advanced well beyond the simple examples set forth in FIGS. 2-6. Sensors typically have multiple modes including, for example, a high frame rate readout mode, an autoexposure and autofocus mode, and a capture mode. As a result, quite complex timing signals are often required to drive contemporary CCD sensors. The high frame rate readout mode may, for example, be used in a hybrid camera when the hybrid camera is used to capture video, whereas the higher resolution capture mode may be used when the hybrid camera is used to take still pictures.

FIG. 7 (Prior Art) illustrates a CCD sensor 23 that requires somewhat more complex timing signals. CCD sensor 23 has a high-speed readout mode wherein pixel mixing is performed. To increase the readout rate of a pixel image, only some of the image sensor samples captured may be read out of the sensor. This reduces the amount of information to be output from the sensor and therefore decreases readout time, but it may cause an undesirable amount of image degradation. If only a subset of the sample charges are output, then image information captured in the other unused local sensors will not be present in the image data as the image data is output from the sensor. Rather than failing to include this image information in the high readout speed mode image, an improved high-speed readout mode image may be had by mixing samples for the local set of sensors, and then shifting out the mixed result. Arrows 24 and 25 illustrate a mixing of two green sensor samples in the top row of sensors. Similarly, arrows 26 and 27 illustrate a mixing of two blue sensor samples in the second row of sensors. At a later stage, vertical mixing may take place as illustrated by arrows 28 and 29. Rather than simply outputting one sample charge from one sensor of a group of sensors and ignoring the sample charges output by other sensors of the group, the sample charges of all the sensors of the group are mixed (using both horizontal and vertical mixing) to improve the quality of the high frame rate readout image.

FIG. 8 (Prior Art) illustrates the more complex timing pulses required to perform this readout. High pulses 30 and 31 on both vertical pulse signals VPULSE1A and VPULSE1B at the same time indicates the horizontal sample mixing operation. The horizontally mixed sample charges, once in the center column of storage elements, are shifted down as set forth above in connection with FIG. 5 by the alternating pulse trains on VPULSE1A and VPULSE1B. Following each vertical shift, a sequence of horizontal shifts of HPULSE1A and HOPULSE1B shifts a mixed row of sample charges out of the CCD sensor.

Due to the complexity of the timing signals required by a typical contemporary CCD sensor, a CCD sensor manufacturer typically also supplies a compatible timing generator integrated circuit for use with the CCD sensor. Accordingly, each CCD sensor typically has its own specific timing generator. This solution to supplying a circuit for generating the needed timing signals can work well in situations where a camera design is only to include one possible type of CCD sensor. For situations in which a choice of any one of multiple different CCD sensors is to be used, however, an AFE/TG integrated circuit having a programmable timing generator is available.

FIG. 9 (Prior Art) is a simplified diagram that illustrates how complex timing signals can be defined in such an AFE/TG. First, a set of signal patterns is defined. In the illustration, VPAT0 is a first pattern, and VPAT1 is a second pattern. Each pattern defines transitions for signals. In the example illustrated, the signals are vertical pulse signals V1-V4. Sequences are then built from the patterns. In the illustration, V-SEQUENCE0 involves repeating VPAT0 N times. V-SEQUENCE1 involves starting with VPAT0 and then ending with VPAT1. The sequences are then associated with different readout regions and fields. A field may contain multiple regions. A different sequence can, for example, be associated with each region where each sequence defines a unique pulse pattern. A typical still digital camera may, for example, require a first field timing for a draft mode, a second field timing for an autofocus mode, and three different field timings for an ordinary image capture mode. During camera operation, a value loaded into a mode register selects which field timing is active, depending on how the camera is being used. For one particular example of a AFE/TG integrated circuit made for use with different CCD sensors, see the "AD9995 12-Bit CCD Signal Processor With Precision Timing Generator" data sheet, Analog Devices Inc., 36 pages, Rev. 0, copyright 2003 (the subject matter of which is incorporated herein by reference).

FIG. 10 (Prior Art) illustrates how three such AFE/TGs 32-34 can be used in a digital still camera. Each AFE/TG receives CCD data from its own CCD image sensor. There is an image sensor for red, one for green and one for blue. AFE/TG 32 supplies a 16-bit red pixel output value to DIP 35 via 16-bit bus 36, multiplexing circuitry 37, and 16-bit bus 38. Next, AFE/TG 33 supplies a 16-bit green pixel output value to DIP 35 via 16-bit bus 39, multiplexing circuitry 37, and 16-bit bus 38. Next, AFE/TG 34 supplies a 16-bit blue pixel output value to DIP 35 via 16-bit bus 40, multiplexing circuitry 37, and 16-bit bus 38. This order of outputting pixel values in the order red, green, blue, red, green, blue etc. continues pixel value by pixel value until all the pixel values of the frame have been transferred to DIP 35.

The architecture of this type of AFE/TG is flexible and works in several applications with several difference CCD sensors. Its programming and operation is, however, somewhat idiosyncratic making it difficult to use. Moreover, there are timing signal requirements and other functionalities and operating modes that the AFE/TG design does not support. For example, stability control may require changing the number of pulses in certain timing signals from one frame to the next when video is being captured. Only a portion of the CCD sensor may be used when taking video. This portion may shift around within the CCD sensor as the user inadvertently moves the camera when taking video. This shifting from frame to frame may introduce undesired jitter into the video. So that the jitter is not seen, it may be desired to change the timing signals supplied to the sensor so that the area of the sensor being used does not appear to shift from one frame to the next. The AFE/TG does not, however, have an ability to receive stability control information on a frame-by-frame basis such that the AFE/TG can generate stability-corrected timing signals that are modified on a frame-by-frame basis. If such a stability control feature were to be supported, then the AFE/TG design would have to be modified. This stability feature is but one feature not supported by the AFE/TG design. Accordingly, as CCD sensors advance in complexity and as CCD sensor timing signal requirements proliferate, the AFE/TG will probably have to be changed over and over through the years in order for the AFE/TG to be able to generate all the timing signals needed to drive the new CCD sensors.

SUMMARY

A versatile analog front end and timing generator (AFE/TG) integrated circuit is capable of supplying horizontal timing signals, vertical timing signals, and other timing and control signals to a selected one of a large number of disparate image sensors.

In a first novel aspect, the AFE/TG includes an output mode wherein multiple identical AFE/TGs output digitized sensor data to a single digital image processor (DIP) without intervening multiplexing circuitry. Rather than outputting digitized sample values in the form of longer words, each AFE/

TG outputs digitized sample values that are truncated down to five bits. Each AFE/TG outputs its five-bit sample value onto a different five lines of a parallel bus. The parallel bus communicates the digitized five-bit values in parallel to the DIP. Because each AFE/TG drives a different set of bus lines, loading on the bus lines is kept to a minimum, thereby facilitating high-speed communication. Only one AFE/TG can be started at a time. Special synchronization functionality is provided so that AFT/TGs that are already operating can begin to start working synchronously with respect to one another.

In addition to this output mode, the AFE/TG also has another output mode for use in situations where only one CCD sensor is used and only one AFE/TG is provided. In this other output mode, successive digitized sensor data words are output to the DIP as complete words in parallel form over the parallel bus.

In a second novel aspect, an AFE/TG includes a processor that executes a program. The program is stored in program memory on the AF/TG. Execution of the program controls the detailed timing of horizontal and vertical timing signals output from the AFE/TG. At boot time, the program is loaded via a serial bus into the program memory within the AFE/TG. Once loaded, the processor can be enabled via the serial interface and made to execute the newly loaded program. In one example, the instruction set of the processor is such that virtually all the instructions in the processor's instruction set are executed in just one clock cycle. Having the processor execute one instruction per clock cycle facilitates tracking execution of the processor through a waveform of horizontal and vertical timing signals, where the waveform is synchronous with the clock cycle. Having the processor execute one instruction per clock cycle facilitates writing code that controls horizontal and vertical timing signals that are synchronous with the clock signal.

The AFE/TG may include one or more registers for communicating information between a device on the serial bus (for example, a microcontroller) and the AFE/TG. The device on the serial bus can, for example, write information into the registers via the serial bus and the serial bus interface of the AFE/TG. The processor is programmed to access the information in the registers and to take appropriate action based on that information. In one example, information is passed to the AFE/TG on a frame-by-frame basis. The AFE/TG uses that information to adjust timing signals supplied to the image sensor such that video being captured is stabilized. This communication technique is employed to combat jitter introduced due to a user of the camera moving during the capture of video.

In a third novel aspect, the processor of the AFE/TG is clocked by a clock signal that has a relatively long clock period. The AFE/TG further includes a timing generator. The timing generator includes a delay locked loop (DLL) circuit and an associated set/reset circuit. The processor sets up the timing generator by writing to registers within the horizontal timing generator. Once the timing generator is set up, the processor enables the timing generator such that it outputs a timing signal in accordance with the set up information defined by the processor. The DLL and set-reset circuit allow the processor to generate timing signals with a resolution substantially greater than the processor clock period.

In a fourth novel aspect, the AFE/TG includes a bit slice output mode wherein multiple identical AFE/TGs output digitized sensor data to a single digital image processor (DIP) without intervening multiplexing circuitry. Rather than outputting digitized sample values in the form of longer words of pixel information, each AFE/TG includes interface circuitry that sections its longer words to be communicated into a number of subsets of bits. For example, one bit of a sixteen-bit long word can be omitted (the sixteen-bit word is truncated down to fifteen bits), and the remaining fifteen bits can be sectioned up into three five-bit subsets. The bits of each subset are communicated in parallel fashion to the DIP across dedicated point-to-point connections to a corresponding set of input terminals on the DIP. The subsets are communicated one by one across these dedicated point-to-point connections. Interface circuitry within the DIP is preconfigured to operate in the bit slice mode. The interface circuitry captures each of the subsets and reassembles the subsets into the longer fifteen-bit word. In an embodiment involving three AFE/TGs, a first AFE/TG communicates with the DIP across a first set of five dedicated point-to-point connections to a first set of five input terminals of the DIP, a second AFE/TG communicates with the DIP across a second set of five dedicated point-to-point connections to a second set of five input terminals of the DIP, and a third AFE/TG communicates with the DIP across a third set of five dedicated point-to-point connections to a third set of five input terminals of the DIP.

The AFE/TG integrated circuit also sees use in other systems where the bit slice mode is not used. The interface circuitry with the AFE/TG can therefore be configured to operate in a time slice (time multiplexing) output mode. When operating the time slice output mode, the multiple AFE/TGs take turns driving long words of pixel information (for example, sixteen-bit values) onto input terminals of the DIP. The AFE/TG integrated circuit design may also see use in situations where there is only one AFE/TG coupled to a DIP, where there are two AFE/TGs coupled to a DIP, or where there are three AFE/TGs coupled to a DIP as described above. Accordingly, a single AFE/TG mode is provided as well as a dual AFE/TG time slice mode and a dual AFE/TG bit slice mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 (Prior Art) is a simplified diagram that is illustrative of circuitry within the CCD image sensor of FIG. 2.

FIG. 4 (Prior Art) is a diagram of waveforms that cause the circuitry of FIG. 3 to shift sample charges.

FIG. 5 (Prior Art) is a simplified diagram of a more involved CCD image sensor wherein columns of sensor share storage cell and vertical transfer line resources.

FIG. 6 (Prior Art) is a diagram of waveforms that cause the circuitry of FIG. 5 to shift sample charges in the vertical and horizontal directions.

FIG. 16 is a software source code program that executes on the processor of the AFE/TG integrated circuit of FIG. 12. Typically such a program is compiled by a compiler fashioned for the instruction set of the processor, and then the resulting object code is loaded into the program memory of the AFE/TG via a serial bus interface.

FIG. 17 is a waveform diagram of vertical and horizontal timing signals generated when the code of FIG. 16 is executed by the processor of the AFE/TG of FIG. 13.

FIG. 23 is a table that illustrates values of a master/slave bit and four other mode control bits that are written into a mode control register of an AFE/TG integrated circuit.

DETAILED DESCRIPTION

Reference will now be made in detail to some embodiments of the invention, examples of which are illustrated in the accompanying drawings.

Figure 11:
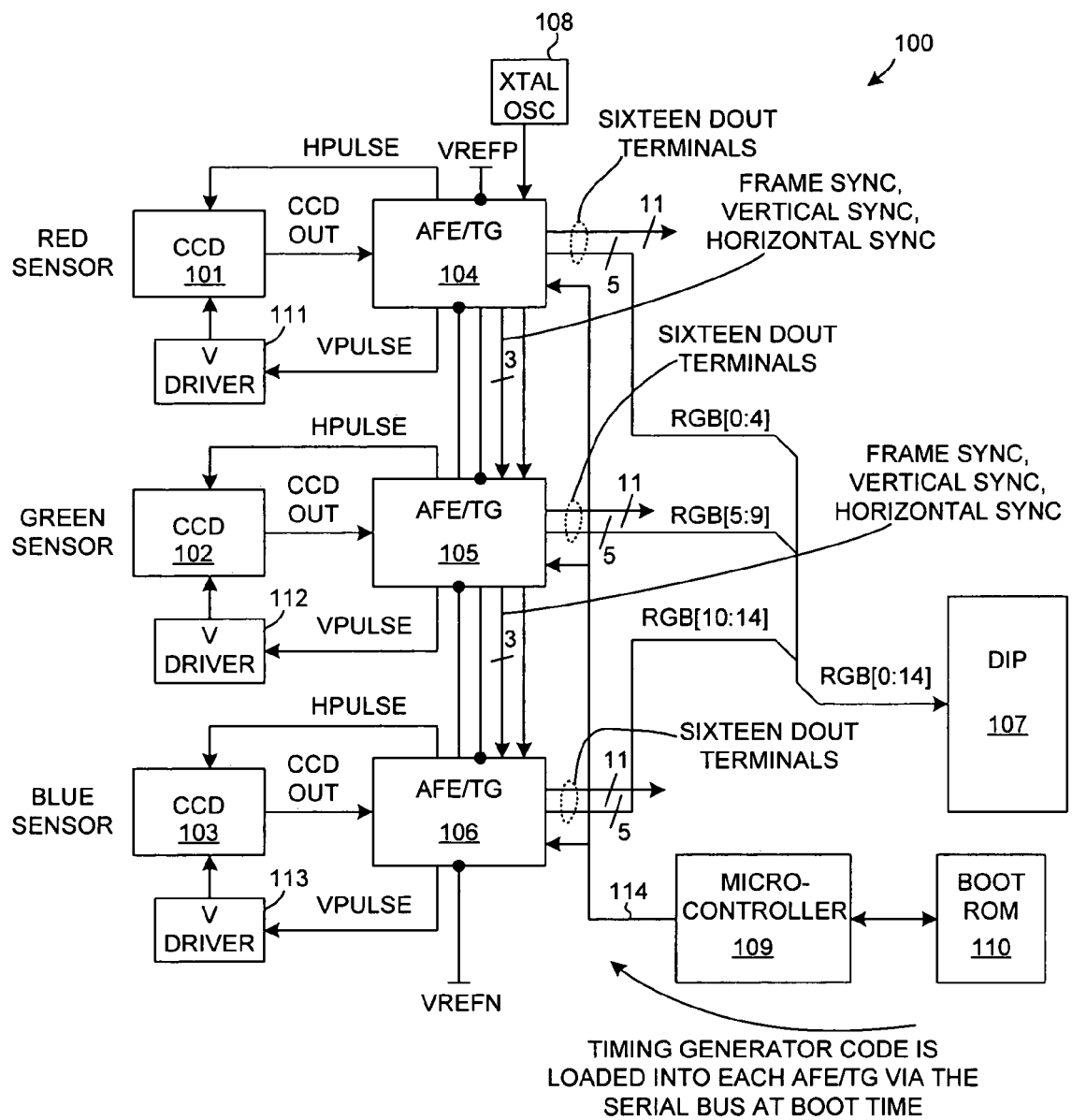
FIG. 11 is a simplified diagram of a digital image capture device in accordance with a first novel aspect. The digital image capture device employs three AFE/TG integrated circuits. Rather than employing additional multiplexing circuitry between the AFE/TGs and the DIP, the AFE/TG is designed to output digitized sample data such that no separate multiplexer circuitry is used. Each of the three AFE/TG integrated circuits outputs its digitized sample data truncated down to five bits. The first AFE/TG outputs its five-bit value onto the upper five bits of a parallel bus that extends to the DIP. The second AFE/TG outputs its five-bit value onto the next five bits of the parallel bus. The third AFE/TG outputs its five-bit value on the next five bits of the parallel bus. The three AFE/TG integrated circuits are synchronized so that they each output sample values onto the parallel bus at the same time. In this way, dedicated and relatively low-noise lines between the AFE/TG and the DIP are provided. These lines have relatively low loading and consequently can transfer data rapidly. In accordance with a second novel aspect, the AFE/TG integrated circuits include processors that execute programs such that when the programs execute, the AFE/TG integrated circuits output horizontal and vertical timing signals as defined by the software. At boot time, the software is loaded into the AFE/TGs via a serial bus. Special synchronization is provided so that the three AFE/TG integrated circuits can be made to execute code synchronously with each other.

FIG. 11 is a simplified block diagram of a digital camera 100 in accordance with one embodiment of the present invention. Camera 100 includes three image sensors 101-103, three analog front end and timing generator (AFE/TG) integrated circuits 104-106, a digital image processor (DIP) integrated circuit 107, a crystal oscillator 108, a microcontroller 109, and a boot read only memory (ROM) 110. Each AFE/TG 104-106 supplies vertical timing signals and horizontal timing signals to its associated image sensor. In the present example, vertical timing signals are supplied directly to each image sensor 101-103. The vertical timing signals are, however, supplied to the image sensor via a vertical driver integrated circuit. Vertical drivers 104, 105 and 106 are the vertical drivers for AFE/TG integrated circuits 101, 102 and 103, respectively.

In the present example, image sensors 101-103 are charge coupled device (CCD) image sensors. Other types of image sensors such as, for example, CMOS image sensors can also be employed. In the present example, a vertical pulse is typically supplied to each image sensor 101-103 as part of a vertical timing signal. This causes each of the rows of sample charges captured in the image sensor to be shifted one row down. A series of horizontal pulses is then supplied to the image sensor as part of a horizontal timing signal. This causes the sample charges of the bottom row to be shifted out of the image sensor. In this fashion, the sample charges of all the sensors within an image sensor is shifted out of the image sensor in serial fashion. The sample charges that are output from an image sensor in the illustration are indicated with the label CCD OUT. There are many horizontal timing signals supplied to the image sensor. In the illustration, these signals are indicated with the label HPULSE. There are many vertical timing signals supplied to the image sensor. In the illustration, these signals are indicated with the label VPULSE.

Figure 1:
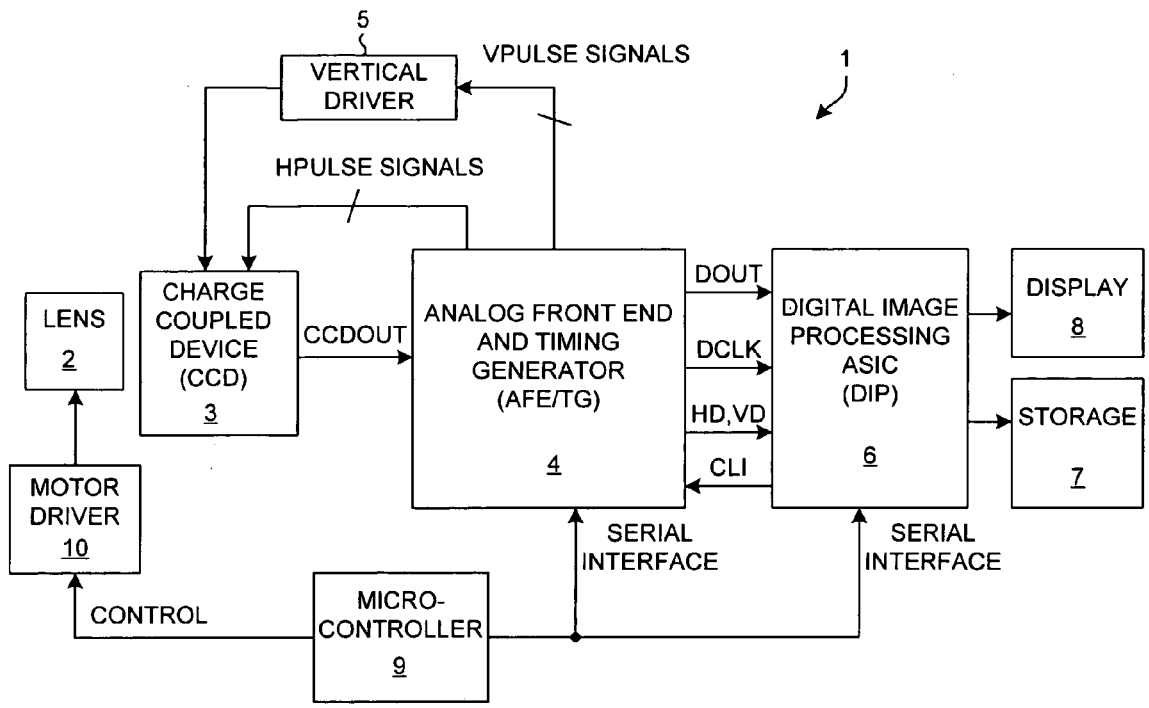
FIG. 1 (Prior Art) is a block diagram of a conventional consumer market digital still camera.
Figure 2:
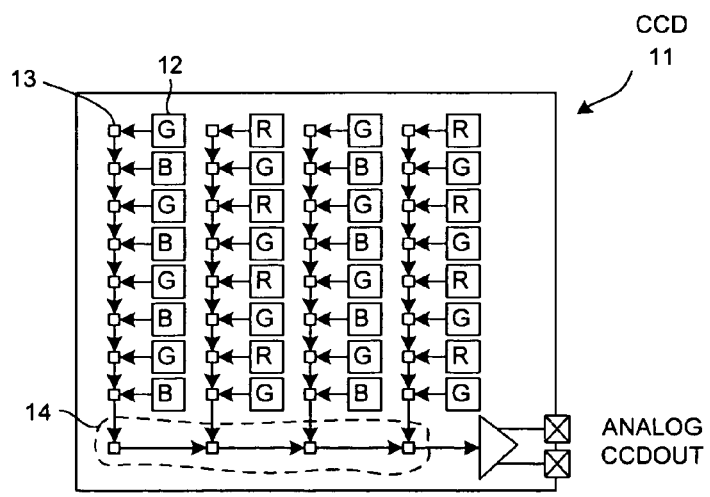
FIG. 2 (Prior Art) is a simplified diagram of a CCD image sensor.
Figure 7:
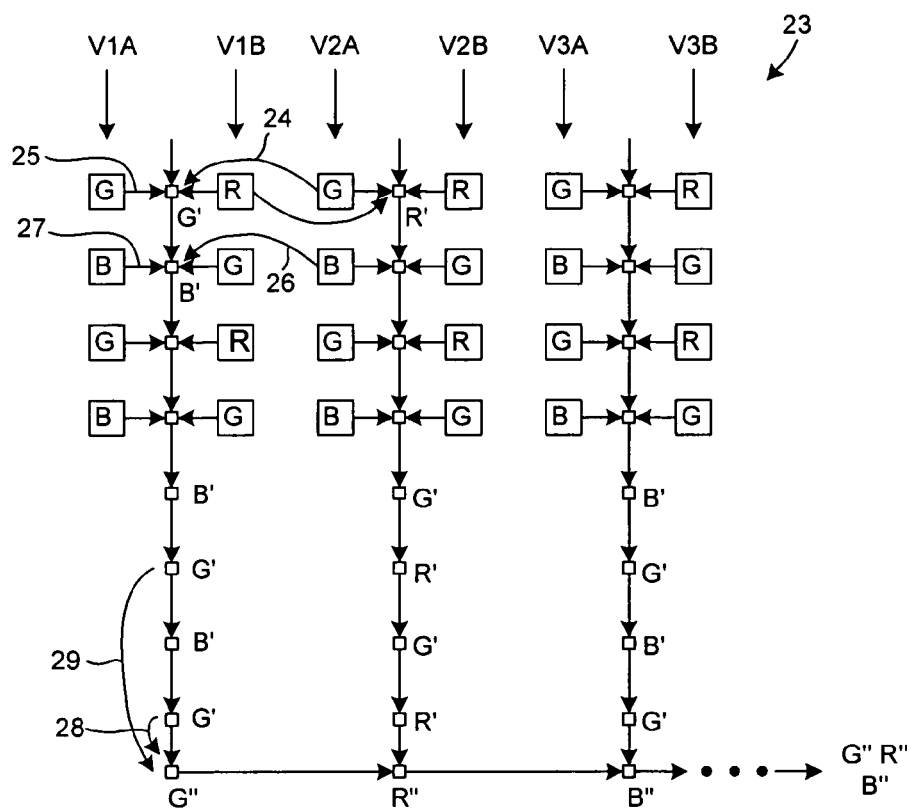
FIG. 7 (Prior Art) is a simplified diagram of an even more complex CCD image sensor that employs pixel mixing in a high-speed readout mode. Both horizontal and vertical mixing is employed.
Figure 8:
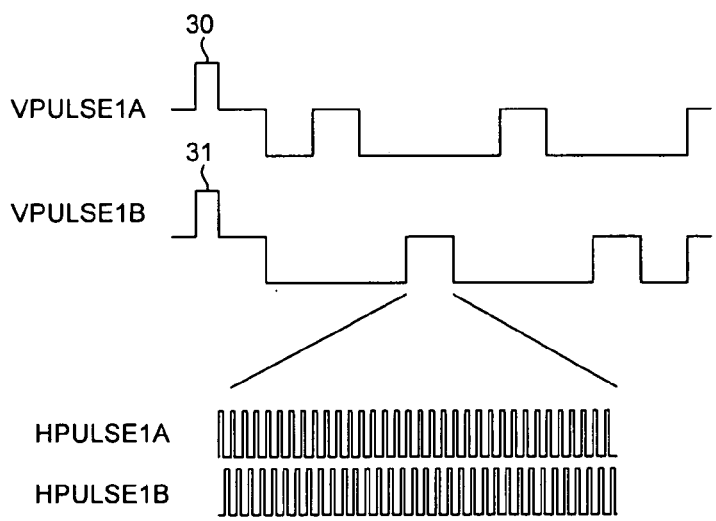
FIG. 8 (Prior Art) is a diagram of waveforms that cause the circuitry of FIG. 7 to shift sample charges in the vertical and horizontal directions.
Figure 9:
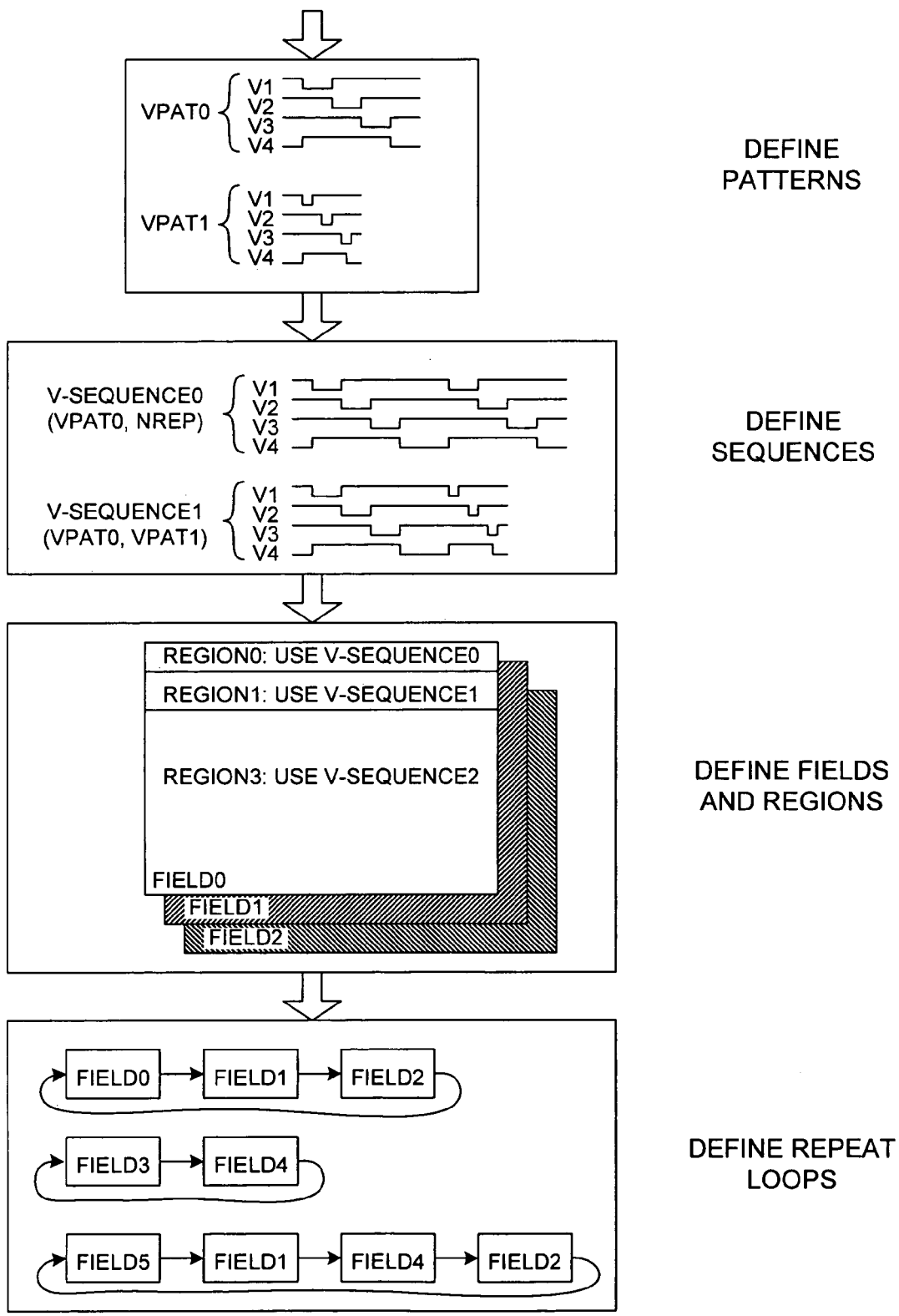
FIG. 9 (Prior Art) is a diagram that illustrates how a programmable AFE and timing generator of the prior art is programmed in order to output a desired set of vertical timing signals.
Figure 10:
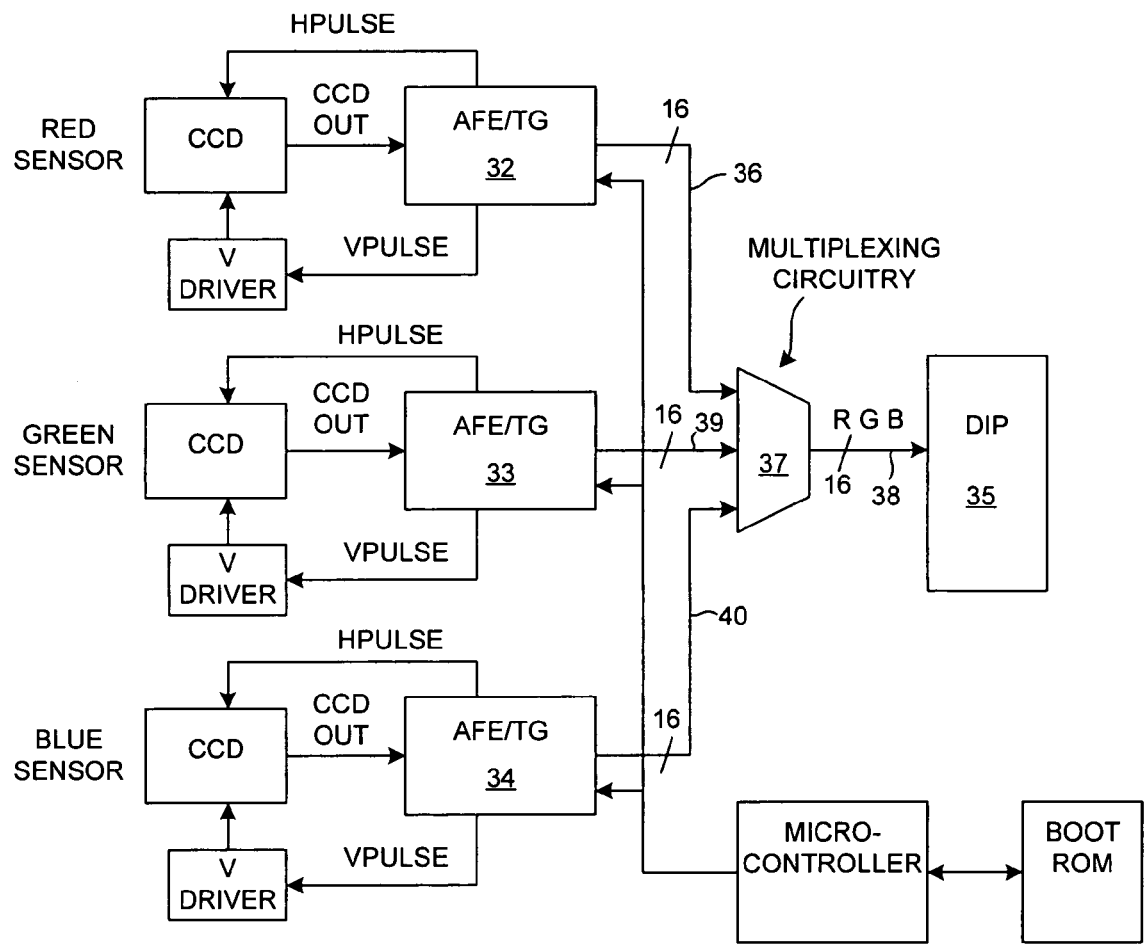
FIG. 10 (Prior Art) is a simplified diagram that illustrates a conventional way that multiple conventional AFE/TG integrated circuits are used to receive image data from multiple image sensors.

The AFE/TGs 104-106 digitize the incoming CCD OUT data and forward the resulting digitized sample values to DIP 107. Rather than supplying the digitized sample values to DIP 107 through multiplexing circuitry as set forth in FIG. 10, no multiplexing circuitry is provided. The multiplexing circuitry of FIG. 10 is often provided in the form of a separate integrated circuit (separate from the AFE/TGs and the DIP) and therefore increases component count in the camera and increases manufacturing cost.

In accordance with a first novel aspect, each AFE/TG integrated circuit 104-106 is an identical integrated circuit that has multiple output modes. A first output mode is for use in applications in which only one image sensor and one AFE/TG are used. In the first output mode, each successive digitized sample value is output from the AFE/TG as a single 16-bit value across sixteen DOUT output terminals. The single 16-bit value is communicated to the DIP as one word across a parallel bus. A second output mode is provided for use in applications in which multiple image sensors and multiple AFE/TGs are used. One example of such a multiple image sensor application is illustrated in FIG. 11.

In the second output mode, each successive digitized sample value is truncated and is output from the AFE/TG as a five-bit value. Each of the AFE/TG integrated circuits outputs its five-bit values to DIP 107 across a different five lines of a parallel bus. Each AFE/TG is therefore coupled to DIP 107 by a dedicated bus line that has reduced loading and therefore has high-speed data transmission ability. AFE/TG 104 outputs five-bit digitized sample values for red. These digitized sample values are communicated to DIP 107 across parallel bus lines RGB[0:4]. AFE/TG 105 outputs digitized sample values for green. These digitized sample values are communicated to DIP 107 across parallel bus lines RGB[5:9]. AFE/TG 106 outputs digitized sample values for blue. These digitized sample values are communicated to DIP 107 across parallel bus lines RGB[10:14]. The outputting of the five-bit digitized sample values onto parallel bus RGB[0:14] by AFE/TGs 104-106 is synchronized to a clock signal supplied by crystal oscillator 108 to each AFE/TG. Each of the AFE/TGs 104-106 outputs a five-bit value onto the RGB bus at the same time.

In accordance with a second novel aspect, each AFE/TG is an identical integrated circuit. Each AFE/TG integrated circuit includes a flexible timing generator that generates the horizontal and vertical timing signals needed to drive the associated image sensor. The flexible timing generator includes a processor that executes instructions. The instructions are stored in a program memory in the AFE/TG integrated circuit. At boot time or when the camera is first powered on, microcontroller 109 executes a boot program out of ROM 110. The boot program causes microcontroller 109 to read a timing generator program from ROM 110 and to load it into program memory in each of the AFE/TGs 104-106. Microcontroller 109 transfers the programs to the AFE/TGs via a serial bus 114 that is coupled to each AFE/TG. Once the timing generator programs have been loaded into the program memories of the three AFE/TGs 104-106, the processors within the AFE/TGs 104-106 access their respective programs and execute the programs. Execution of a program by an AFE/TG causes a particular set of horizontal and vertical timing signals to be output from the AFE/TG. The timing of the horizontal and vertical signals is determined by parameters set by software and by operation of the software itself.

If a different type of image sensor is to be used that requires a different set of horizontal and vertical timing signals, then the timing generator program can be modified. The modified timing generator program can be loaded into the various AFE/TGs 104-106 via the serial bus 114. Operation of the newly loaded timing generator program can then be tested, modified, reloaded and retested until camera operation with the different image sensor is satisfactory.

In the arrangement of FIG. 11, execution of code by an AFE/TG is initiated by a communication sent from microcontroller 109 across serial bus 114. Because only one AFE/TG can be communicated with at a time across the serial bus, starting the AFE/TGs 104-106 must be done one at a time. If one AFE/TG is started before another AFE/TG, then the two AFE/TG's will not be synchronized with one another as desired. In accordance with the first novel aspect, synchronization functionality is provided. AFE/TG 104 is a master, and AFE/TGs 105 and 106 are slaves. The master outputs three synchronization signals to the slaves: 1) a frame synchronization signal, 2) a vertical synchronization signal, and 3) a horizontal synchronization signal. Execution of the processors in the three AFE/TGs is started one-by-one using serial bus 114. The master AFE/TG outputs synchronization signals on a separate 3-bit bus, and the slave AFE/TGs use these signals to determine when to start outputting digitized sample values. The three AFE/TG devices can therefore be started one at a time, but can then be made to start operating synchronously with respect to one another.

Figure 12:
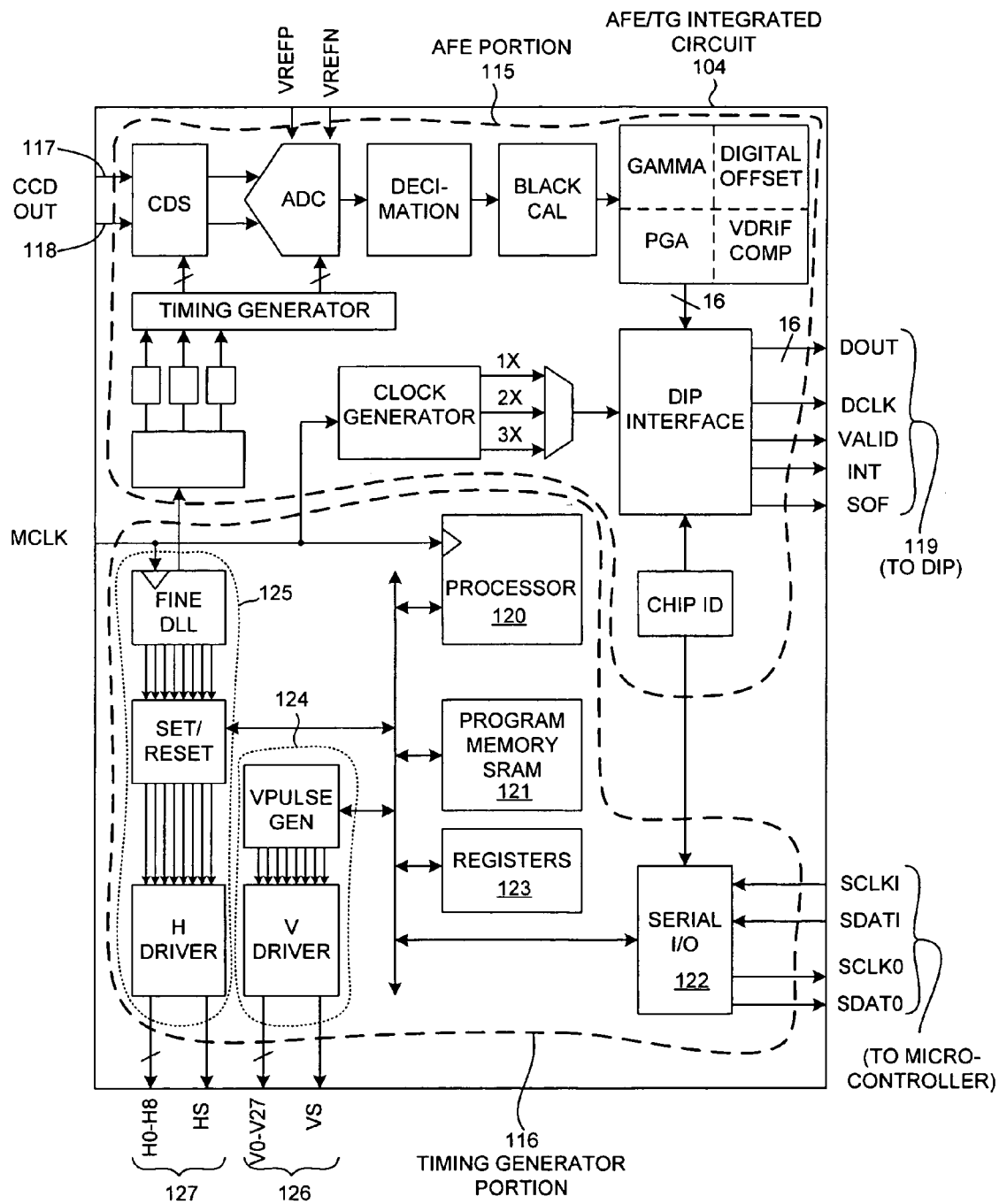
FIG. 12 is a more detailed block diagram of the AFE/TG integrated circuits of FIG. 11.

FIG. 12 is a more detailed block diagram of AFE/TG 104. AFE/TG 104 includes an analog front end portion 115 and a timing generator portion 116. The analog front end portion 115 receives analog sample information CCD OUT from image sensor 101 on input terminals 117 and 118. Analog front end portion 115 digitizes the CCD OUT information and outputs the digital result DOUT to DIP 107 via interface 119. Timing generator portion 116 includes a processor 120, a program memory 121, a serial interface 122, configuration and communication registers 123, vertical timing signal generation circuitry 124, and horizontal timing signal generation circuitry 125. Processor 120 executes a program stored in program memory 121. Execution of the program causes processor 120 to control the vertical and horizontal timing generators 124 and 125 such that vertical and horizontal timing signals required by image sensor 101 are output from terminals 126 and 127, respectively. At camera boot time, the program is loaded into the timing generator portion 116 via serial bus interface 122. Once the serial bus interface 122 has loaded the program into program memory 121, processor 120 is enabled such that processor 120 executes the program. The H driver block of the horizontal timing generator 125 represents high drive current I/O buffer circuitry. Although a V driver block is illustrated as being part of the AFE/TG integrated circuit in FIG. 12, the V driver functionality is generally realized outside the AFE/TG integrated circuit in the form of a separate V driver integrated circuit.

Figure 13:
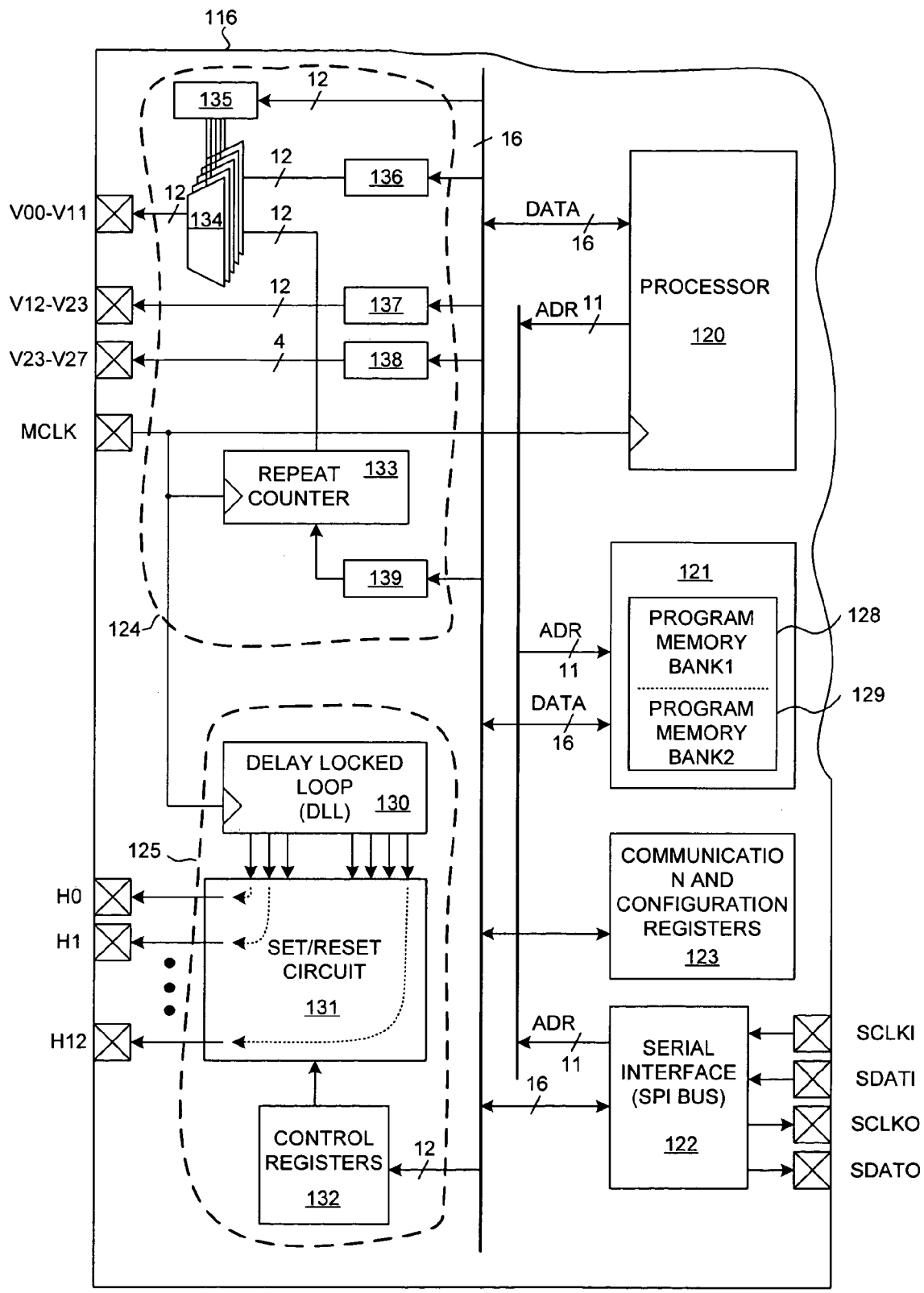
FIG. 13 is a more detailed block diagram of the timing generator portion of the AFE/TG integrated circuit of FIG. 12.

FIG. 13 is a more detailed block diagram of timing generator portion 116. Processor 120 fetches 16-bit instructions from program memory 121 via address bus ADR and data bus DATA. The 16-bit instructions have a variable number of opcode bits. The instruction set includes basic one-operand and two-operand operations, branch operations (conditional or unconditional), a function call (no parameter passed), a function return operation, and a while loop operation. All operations are unsigned operations. An eight-level deep function call stack is supported. All the instructions (except the special bank_return instruction, which takes two MCLK cycles) execute in a single clock cycle of MCLK. This allows the execution of the processor in relation to MCLK to be easily predicted and therefore facilitates the control of the vertical and horizontal timing generator circuitry at the correct times. A single delay(n) instruction is provided, which when executed causes a delay of n MCLK cycles.

Program memory 121 includes two single-port SRAM banks 128 and 129. Processor 120 can execute instructions out of either bank. Two bits in communication and configuration registers 123 indicate whether the processor is disabled, and which bank the processor has access to. Upon power up, the bits are set such that processor 120 is disabled and such that processor 120 has access to bank 1. The serial interface 122 can therefore access bank 2. Serial interface 122 can read from any of the registers of the timing generator portion 116 across the address and data bus. Accordingly, the microcontroller 109 (see FIG. 11) external to the AFE-TG can transfer a program into SRAM bank 129 via serial interface 122. Once the program has been loaded, then microcontroller 109 causes serial interface 122 to write to the two bits in communication and configuration registers 123 such that the SRAM bank accessed by the processor switches from bank 128 to bank 129 and such that the processor is enabled. Processor 120 then executes the newly loaded code out of bank 129. Once the processor is enabled, serial interface 122 is prevented from writing to the registers of the vertical and horizontal timing generators. The serial interface 122 can, however, provide information to timing generator portion 116 by writing to certain registers of communication and configuration registers 123. The information loaded into the communication and configuration registers 123 by the serial interface 122 can be accessed and used by software being executed by processor 120. The information passed to the AFE/TG in this manner can, for example, provide instructions on how to adjust the timing signals to achieve stability control to help combat the effects of the user moving the camera during the capture of video. Serial interface 122 can also write to the two bits in the configuration and communication registers 123, stop processor 120, and take back control of timing generator portion 116.

Horizontal timing generator 125 includes a fine delay locked loop (DLL) 130, a set/reset portion 131, and a plurality of control registers 132. DLL receives clock signal MCLK that is clocking processor 120. DLL generates sixty-four versions of MCLK, each delayed slightly with respect to the next. These delayed versions of MCLK are supplied to set/reset portion 131. Each of the horizontal timing signal terminals H0-H12 to be driven has a corresponding register within registers 132. This register includes a set number and a reset number. The set number defines which one of the sixty-four versions of MCLK, the rising edge of which will determine when a set-reset latch is set. The reset number defines which one of the sixty-four versions of MCLK, the rising edge of which will determine when the set-reset latch is reset. The output of the set-reset latch is then used as the signal that is supplied to the horizontal timing signal terminal.

Figure 14:
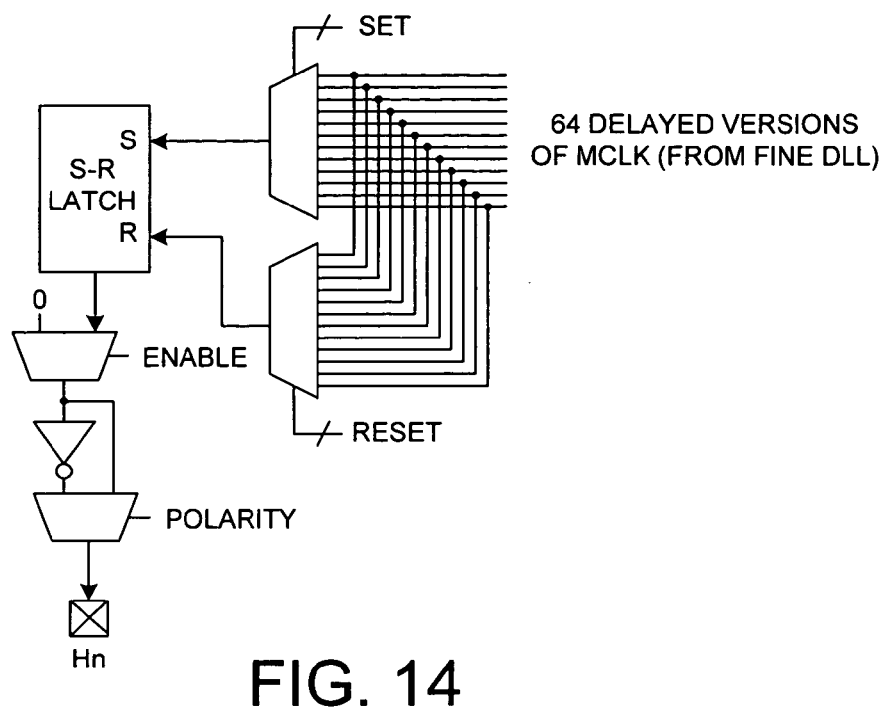
FIG. 14 is a simplified circuit diagram of part of the circuitry of the horizontal timing generator circuitry of the timing generator portion of FIG. 13.

FIG. 14 illustrates circuitry of set/reset portion 131 of FIG. 13. The circuitry of FIG. 14 is replicated once for each of the thirteen horizontal timing signal terminals H0-H13 to be driven. The control registers 132 of the horizontal timing generator 125 also include an enable bit and a polarity bit for each of the thirteen terminals H0-H12. FIG. 14 illustrates how these bits are used to enable the horizontal timing signal and to control the polarity of the horizontal timing signal. When one of the registers of control registers 132 is written, it is written synchronously with respect to MCLK. The horizontal timing generator 125 takes action based on the new contents of the register on the next cycle of MCLK.

In accordance with a third novel aspect, a processor of a programmable AFE/TG uses a DLL and associated set and reset circuitry to generate timing signals with precisely controlled rising and falling edges, wherein the resolution at which the rising and falling edges are controlled is substantially greater than the period of the clock signal MCLK that is clocking the processor. A rising or falling edge of a horizontal timing signal may, for example, be adjustable in 25 nanosecond increments, whereas the processor controlling the AFE/TG is being clocked by a relatively slow clock signal having a period that is one, two or more orders of magnitude greater than the adjustable increment.

Control registers 132 also contain, for each horizontal timing signal terminal, a control bit that indicates a drive strength. The control bit is supplied to an H driver block (not shown) disposed between the set/reset portion 131 and the horizontal timing signal terminals. In an alternative embodiment, the H driver is disposed outside the AFE/TG integrated circuit. Another of the control registers 132 contains a bit that when set causes four of the registers storing set numbers and reset numbers to be used in combination to output four-phase horizontal timing signals. Control registers 132 also contain bits that when set cause selected ones of the horizontal timing signal terminals and any associated drive circuitry to be powered down.

Figure 15:
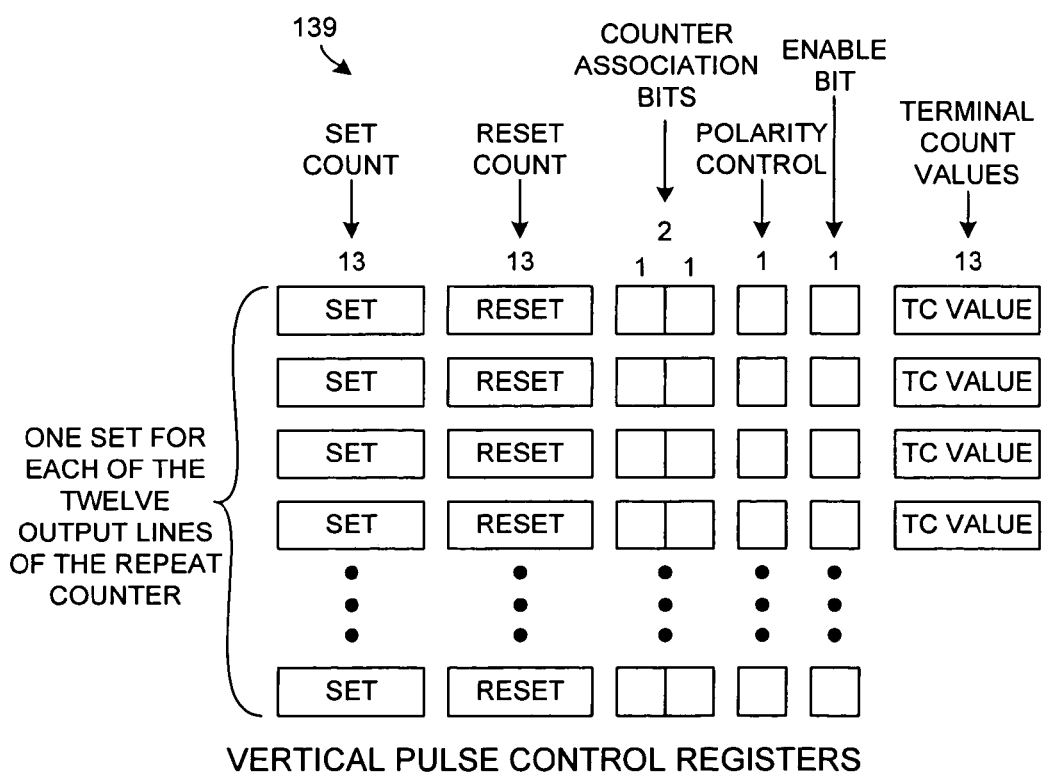
FIG. 15 is an illustration of the registers usable to control how the vertical timing generator portion operates to generate customized timing signals.

Vertical timing circuitry 124 includes a repeat counter 133, a set of multiplexers 134, and a set of control registers 135-139. FIG. 15 is an illustration of the registers 139 usable to control how the vertical timing generator portion 124 operates to generate customized timing signals. Repeat counter 133 actually includes four counters. Each of the counters counts up to a terminal count value, and then rolls over and continues counting up. Processor 120 can determine the terminal count values for the four counters by loading four 13-bit terminal count values shown at the right of FIG. 15.

Registers block 139 includes twelve sets of registers. Each set includes a set count value, a reset count value, a pair of counter association bits, a polarity control bit, and an enable bit. Each set is associated with a respective one of the vertical timing signal terminals V00-V11. The set count value indicates the count at which the signal is to be set. The reset count value indicates the count at which the signal is to be reset. The counter association bits indicate to which one of the four counters the set and reset values refer. Processor 120 can write each of the values of FIG. 15 in order to define vertical timing signals output by the repeat counter block 133. Accordingly, the bus extending out of repeat counter block 133 in FIG. 13 has twelve bits. Register 135 can be set on a bit by bit basis to either couple a bit of the repeat counter output to its associated vertical timing signal terminal or to couple one of the output bits of register 136 to the vertical timing signal terminal.

In operation, processor 120 sets up the vertical timing generator 124 by writing appropriate values into registers 135-139. Once these registers are set up, then processor 120 sets the enable bit for a desired output terminal. Setting this bit causes the vertical timing generator 124 to generate a vertical timing signal with a desired timing. The vertical timing signal is output onto the associated vertical timing signal terminal.

Configuration and communication registers 123 include, in addition to the bits set forth above, a register for passing information from the DIP to the AFE/TG. A similar register is provided for passing information in the other direction from AFE/TG to DIP. Configuration and communication registers 123 also include an H-V swapping register. The register includes one bit for each of a plurality of the horizontal timing signal terminals. Each of these terminals is associated with a respective one of the vertical timing signal terminals. When the bit associated with the horizontal timing signal terminal is set, then the signal on the corresponding vertical timing signal terminal will be output from the horizontal timing signal terminal and visa versa. A H-V swap enable bit is provided. When this H-V bit is asserted, then the swapping indicated by the swap bits is enabled.

EXAMPLE

FIG. 16 sets forth source code of a program. The source code program is compiled into object code. The object code is then loaded into AFE/TG 104 via serial interface 122 and is executed by processor 120. Execution causes AFE/TG integrated circuit 104 to generate the horizontal and vertical timing signals of FIG. 17 for the "readout" mode of an image sensor similar to the ICX452AQ CCD Image sensor available from Sony Corporation. A "dataout" mode waveform is performed once to transfer charge from the CCD sensors to their associated storage elements. After the "readout" mode waveform has been applied, then a subsequent "dataout" mode waveform of FIG. 17 is performed to read the data out of the CCD sensor. The "dataout" mode waveform is therefore performed multiple times such that row by row of image data is output from the CCD sensor. In the present example, the CCD sensor has 224 rows (a row is called a "line" in the code of FIG. 16).

Consider the generation of two identical horizontal timing signals H1A and H1B. First, the set number and the reset number associated with the H1 horizontal timing signal terminal are programmed. This occurs at line 200. The values 47 and 16 are loaded into different parts of general purpose register GP3. Then in line 201 the content of general purpose register GP3 is loaded into special register SP1. Special register SP1 is the register within control registers 132 of FIG. 13 that holds the set number and the reset number for the horizontal timing terminal H1.

Once this initialization is complete, execution of the main program at line 202 begins. Bit 0 of the AUX0 register of communication and configuration registers 132 contains a flag. This flag indicates whether the camera is to operate in the high frame dataout mode or not. Accordingly, the UNTIL (AUX0[0]) of line 203 causes the next block of code (that ends at the subroutines) to be repeated over and over as long as the flag bit indicates operation is to remain in the high frame dataout mode.

Next, it is desired to enable the horizontal timing signal H1. As set forth above, each horizontal timing signal terminal has an associated enable bit in one of the control registers 132. This register is denoted AUX3. Accordingly, the bit in GP3 corresponding to H1 is set in line 204, and the content of register GP3 is transferred in line 205 to AUX3 to set the desired enable bit for H1.

For this CCD sensor, the vertical synchronization signal VD is to start off set. This is accomplished at line 206. There may be undesirable residual charge in the CCD sensor at this time. Consequently a single "dataout_line" subroutine operation is performed to clear out any such garbage that might be present in the CCD sensor before the charge transfer is performed. The single "dataout_line" is performed at line 207 by calling the subroutine "dataout_line". The subroutine "dataout_line" starts at line 208.

FIG. 17 illustrates the desired waveforms of the "dataout_line" subroutine. Note that the horizontal timing signals H1A and H1B are active (enabled) initially, and then are disabled at MCLK number 44. After a delay (42) operation is performed in line 211, the enable bits in AUX3 corresponding to the H1 and H2 timing signal terminals are reset in line 212. The resetting of these bits takes effect in the next MCLK cycle, which is clock cycle 44. H1A and H1B are therefore disabled at MCLK 44 as indicated in FIG. 17.

After a series of operations that cause other timing signals to change values, the enable bits in AUX3 that correspond to the H1 and H2 timing signals are again set in line 213. As indicated, the enabling of H1 and H2 takes effect at the next MCLK (MCLK 980) as desired in the waveform of FIG. 17.

After the waveforms of FIG. 17 have been generated, execution proceeds to line 209. In line 209, the data "readout_line" subroutine is called. This routine causes timing signals to be supplied to the CCD sensor such that sample charges are transferred from the sensors to the storage elements of the CCD. The "readout_line" subroutine starts at line 219. At line 214, a count value of six is loaded into register RGP3. This count value is used in line 215 to loop through line 216 until CCD row 10 is reached. According to the CCD sensor requirements, the vertical synch signal is to reset at this point in the frame. At line 217, the register bit in register GP0 that corresponds to the vertical synchronization signal VD is reset. The "dataout_line" subroutine is then called again in a loop until row 244 is reached. If operation is to continue in the high-speed readout mode, then the flag bit AUX0[0] will still be set. If AUX0[0] is set, then the goto statement of line 218 causes the entire process to be repeated.

In the example of FIG. 17, the vertical timing signals are generated without using repeat counter 133. Rather, the bits in the registers associated with the vertical timing signal terminals are merely set and reset at the MCLK cycle numbers necessary to generate the waveform of FIG. 17. For each output terminal, there is an associated bit in a writable register. The contents of the bit in the register is coupled via a hardwired connection to the output terminal. To cause the signal on the output terminal to transition, the processor 120 writes an appropriate value into the bit of the register.

In FIG. 13, register 135 is loaded such that multiplexers couple the twelve bits of register 136 to twelve respective output terminals V00-V11. To set vertical timing signal V1 high, processor 120 writes the corresponding bit in register 136 one MCLK cycle before the high transition is to occur in vertical timing signal V1. On the next MCLK, the high transition of the vertical timing signal V1 on output terminal V01 transitions high.

In the example of FIG. 16, the actual V1 timing signal is a ternary signal that is to have three voltage levels. A V driver chip external to the AFE/TG receives two bits as control as well as three voltage supplies, −8V, 0V and +15V. The driver chip uses these two bits to generate the ternary output signal V1. In the example of FIG. 16, the two bits that control the external V driver chip are set or reset by writing to bit 0 of register GP0 and bit 0 of register GP1. Registers GP0 and GP1 correspond to register 136 in the illustration of FIG. 13. The other vertical timing signals needed are generated in similar fashion by writing to bits in registers associated with those other vertical timing signals.

AFE/TG and DIP Integrated Circuits Having Bit Slice and Time Slice Modes

Figure 18:
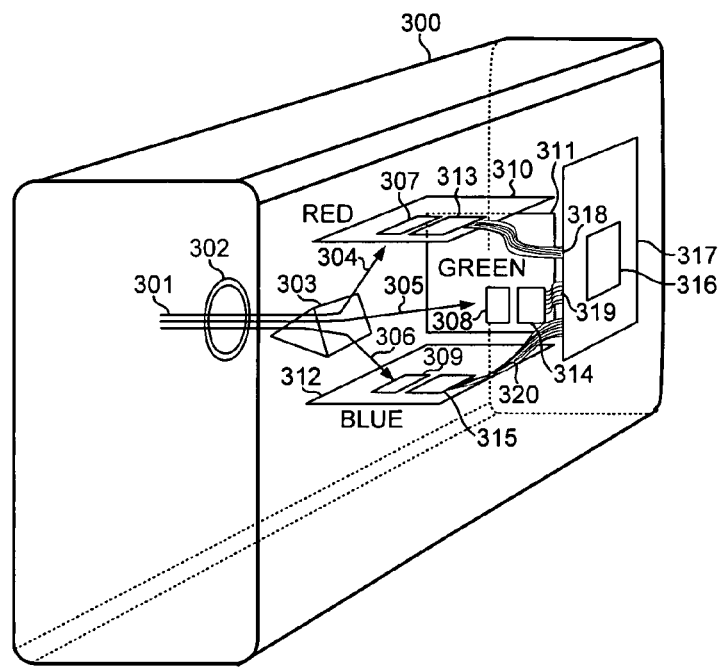
FIG. 18 is a three-dimensional perspective view of a camera in accordance with another embodiment.
Figure 19:
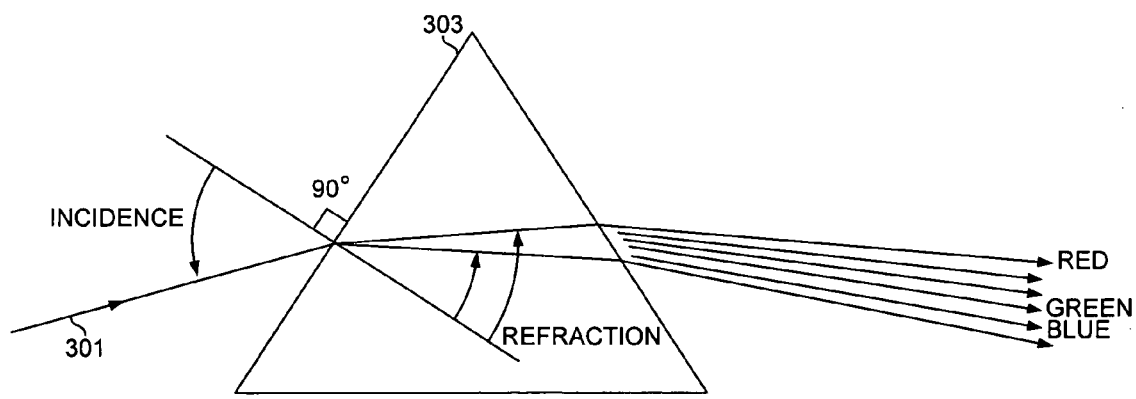
FIG. 19 is a simplified diagram that illustrates how light is broken into three component portions within the camera of FIG. 18.

FIG. 18 is a simplified perspective three-dimensional diagram of a digital camera 300. Light 301 enters the camera through an aperture 302 and passes through a prism 303 and is split into three component portions 304, 305 and 306. For simplification purposes, portion 304 is designated as the red portion, portion 305 is designated as the green portion, and portion 306 is designated as the blue portion. FIG. 19 is an expanded view that illustrates how light 301 is broken into the three component portions such that each of the component portions is directed in a different direction. It is to be understood that a prism in an actual camera may be of any suitable shape and may not be triangular in cross-section.

Portion 304 is incident on an image sensor 307. Portion 305 is incident on an image sensor 308. Portion 306 is incident on an image sensor 309. The three image sensors 307-309 are disposed in different physical locations so that each receives a different portion of the light 301. Typically, each image sensor is disposed on a different printed circuit board within the camera so that the image sensor will be disposed in the proper place and in the proper orientation to receive the appropriate portion of the light. In the embodiment illustrated in FIG. 18, image sensor 307 for red is disposed facing downward on a upper horizontally-disposed printed circuit board 310, image sensor 308 for green is disposed facing out from the page on a vertically-disposed printed circuit board 311, and image sensor 309 for blue is disposed facing upward on a bottom horizontally-disposed printed circuit board 312. The image sensors may, for example, be CCD or CMOS image sensors.

Each image sensor has an associated analog front end/timing generator (AFE/TG) integrated circuit that is disposed along with the image sensor on the same printed circuit board. As set forth in the description above, the AFE/TG generates timing signals and supplies those signals to the associated image sensor so that the image sensor outputs pixel information and forwards the pixel information back to the AFE/TG. In the illustration of FIG. 18, AFE/TG 313 is the AFE/TG that receives red pixel information from red image sensor 307, AFE/TG 314 is the AFE/TG that receives green pixel information from green image sensor 308, and AFE/TG 315 is the AFE/TG that receives blue pixel information from blue image sensor 309.

Each of the three AFE/TG integrated circuits 313, 314 and 315 forwards its respective pixel information to a single digital image processor (DIP) integrated circuit 316. DIP 316 performs image processing on the pixel information and then typically stores the image as a file in mass storage. This image processing can, for example, include bad pixel swapping, Bayer to RGB conversion, white balance, color correction, gamma correction, RGB to YUV color space conversion, unsharp masking, gamma correction, mirroring, resizing, zooming, and conversion into a compressed image file. DIP 316 and other digital circuitry may, for example, be disposed on a printed circuit board 317 (called the "digital back end" as opposed to the "analog front end") that is separate from the other printed circuit boards 310-312 in order to prevent noise from the digital circuitry from affecting more sensitive analog circuitry on the other printed circuit boards. Due to the different physical orientations of the printed circuit boards 310-312 and 317, each analog printed circuit board 310-312 is coupled to the digital printed circuit board 317 by a respective one of three flexible connections (for example, dedicated ribbon cables or flex circuits) 318-320.

In one example, each of the AFE/TG integrated circuits outputs pixel information in parallel from an output port. This output port may, for example, involve sixteen terminals that output a sixteen-bit pixel value. This parallel pixel information flows across the ribbon cable of flex circuit to a corresponding input port on the DIP integrated circuit 316. The input port may, for example, involve sixteen terminals that receive the sixteen-bit pixel value in parallel fashion. The output ports of the three AFE/TG integrated circuits are coupled together so that any one of the AFE/TG integrated circuits can drive a sixteen-bit pixel value onto the input port of DIP integrated circuit 316. At a first time, AFE/TG integrated circuit 313 drives a sixteen-bit value in parallel across a ribbon cable or flex circuit to DIP integrated circuit 316.

This value is latched into DIP 316. During this time, AFE/TG integrated circuits 314 and 315 are not driving signals onto the ribbon cable or flex circuit.

Next, AFE/TG 313 puts its output buffers into the high impedance state so that AFE/TG 313 is no longer driving a signal onto the input terminals of DIP 316. The second AFE/TG 314 then enables its output drivers and drives a sixteen-bit pixel value for green onto the input port of DIP 316. This value is latched into DIP 316. Neither AFE/TG 313 nor AFE/TG 315 is driving signals onto the ribbon cables or flex circuits at this time.

Next, AFE/TG 314 puts its output buffers into the high impedance state so that its output buffers no longer drive a signal onto the input terminals of DIP 316. The third AFE/TG 315 then enables its output drivers and drives a sixteen-bit pixel value onto the input terminals of DIP 316 such that DIP 316 can latch in the pixel value. In this time multiplexing fashion, a sequence of sixteen-bit pixel values is driven from AFE/TG integrated circuits 313-315 onto the input terminals of DIP 316. Only one AFE/TG drives the input terminals of DIP 316 at a given time. The AFE/TG integrated circuits 313-315 take turns in driving the input terminals of DIP 316.

This time multiplexing scheme has disadvantages. First, each input terminal on DIP 316 that receives a bit of pixel information is coupled to an output terminal of each of the three AFE/TG integrated circuits 313-315. Each output driver has an amount of capacitance that it adds to the node. Moreover, the connection from each AFE/TG output terminal to its corresponding input terminal on DIP 316 includes a conductor within the connector (ribbon cable or flex circuit). This conductor adds further capacitance to the node. The node may, for example, have a capacitance of 90 pF. Moreover, the connection is a branched node that extends down three ribbon cables or flex circuits to three AFE/TG integrated circuits. It therefore may have undesirable transmission line ringing and reflection characteristics. The loading due to having multiple AFE/TG integrated circuits coupled in parallel to the input port of DIP 316 may slow the transitioning of signals from the AFE/TG integrated circuits to DIP 316, may increase power dissipation of the AFE/TG integrated circuits driving the cables, and may require that the drivers within the AFE/TG integrated circuits be made undesirably large. Expensive ribbon cables or flex circuits with ground planes, the individual conductors of which have reduced capacitances, may be necessary in order to meet desired data speed transmission requirements. If the amount of data that is to be communicated from the AFE/TG integrated circuits to the DIP is high, then it may be difficult to control the output drivers of the AFE/TG integrated circuits so that the drivers from one AFE/TG stop driving the input terminals of DIP 316 at precisely the time the drivers of the next AFE/TG start driving the input terminals. The amount of time that no AFE/TG integrated circuit is driving the bus should be minimized, but yet the output drivers of two AFE/TG integrated circuits should not contend with one another on the bus.

Figure 20:
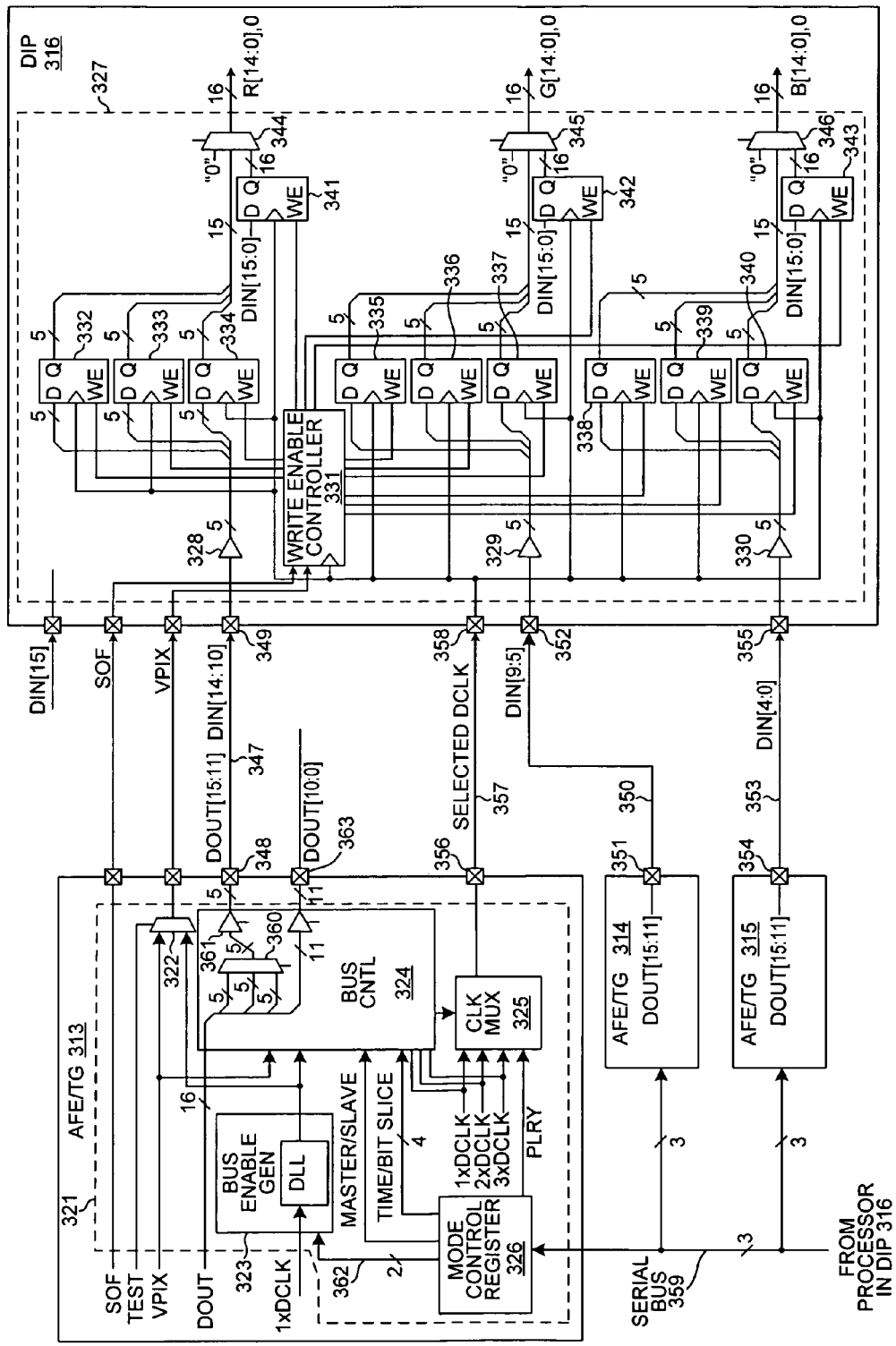
FIG. 20 is a simplified block diagram showing how three AFE/TG integrated circuits are coupled to a DIP integrated circuit in a bit slice manner within the camera of FIG. 18. Each AFE/TG integrated circuit includes an interface circuit that converts parallel pixel information into smaller subsets of bits. These smaller subsets of bits are then communicated one at a time to the DIP across dedicated connections. Interface circuitry within the DIP receives the sequence of subsets of bits and deserializes the subsets to regenerate the original parallel pixel information.

FIG. 20 is a more detailed block diagram of the system of FIG. 18, but in the example of FIG. 20 each AFE/TG integrated circuit is coupled to DIP 316 by dedicated point-to-point connections. AFE/TG 313 includes an interface circuit portion 321. Interface circuit portion 321 includes a multiplexer 322, a bus enable generator circuit 323, a bus controller 324, a clock multiplexer 325, and a mode control register 326. Although AFE/TG integrated circuits 314 and 315 are shown as blocks to clarify the illustration, these AFE/TG integrated circuits 314 and 315 are identical to AFE/TG 313 and include identical interface circuit portions.

DIP 316 includes an interface circuit portion 327. Interface circuit portion 327 includes input buffers 328-330, a write enable controller 331, three sets of five-bit registers 332-340, three sixteen-bit registers 341-343, and three sixteen-bit wide 2:1 multiplexers 344-346.

In a "Bit Slice 3 AFE Mode", AFE/TG 313 communicates red pixel value information across five point-to-point connections 347 from five output terminals 348 of AFE/TG 313 to five input terminals 349 of DIP 316. AFE/TG 314 communicates green pixel value information across five point-to-point connections 350 from five output terminals 351 of AFE/TG 314 to five input terminals 352 of DIP 316. AFE/TG 315 communicates blue pixel value information across five point-to-point connections 353 from five output terminals 354 of AFE/TG 315 to five input terminals 355 of DIP 316. AFE/TG 313 also communicates a clock signal 3xDCLK from terminal 356, across clock line 357, to clock input terminal 358 of DIP 316.

Figure 21:
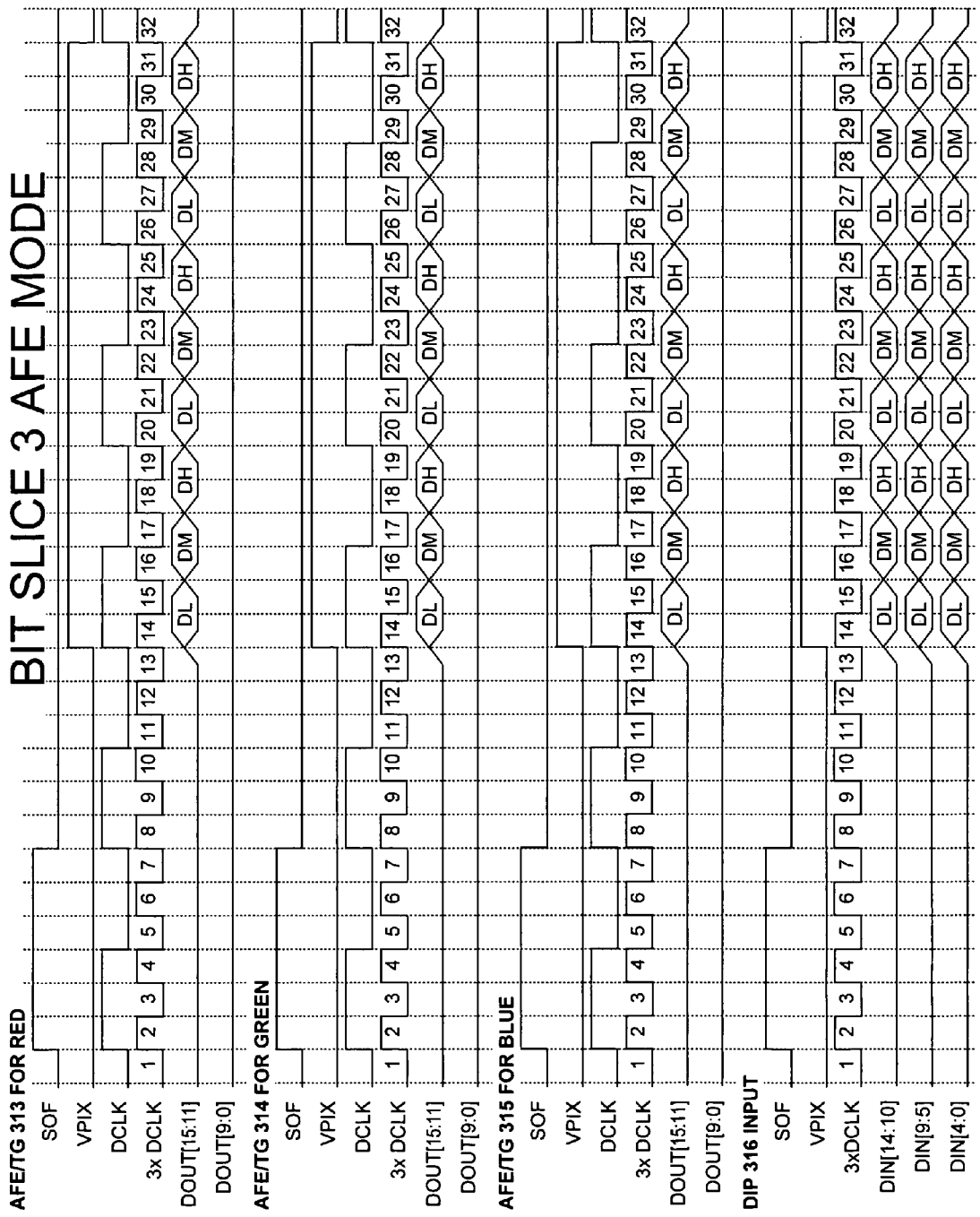
FIG. 21 is a waveform diagram that illustrates operation of the bit slice operation carried out by the system of FIG. 20.

FIG. 21 is a waveform diagram of "Bit Slice 3 AFE Mode" operation. Initially, a processor (not shown) within DIP 316 writes a mode control value into a mode control register (not shown) within write enable controller 331. The mode control value puts the interface circuitry 327 into "Bit Slice 3 AFE Mode" operation as will be explained in further detail below. The processor also communicates via a three-wire serial bus 359 with each of the AFE/TG integrated circuits 313-315 and writes mode control values into their mode control registers. The mode control value written into the mode control register 326 of AFE/TG 313, for example, places the AFE/TG 313 into the "Bit Slice 3 AFE Mode."

FIG. 23 is a table that illustrates the values of the master/slave bit and the four other mode control bits that are written into mode control register 326. In a bit slice mode, the master/slave bit is a don't care and is therefore designated with an "X" in the table. The four additional mode control bits are "0101" for AFE/TG 313 because AFE/TG 313 is to be the master. The four additional mode control bits are "0001" for AFE/TG 314 and 315 because these two AFE/TGs are to be slaves to the master.

Once the mode control registers of the AFE/TG integrated circuits have been loaded with the correct values, the operation illustrated in the waveform of FIG. 21 takes place. The clock multiplexer 325 of the AFE/TG 313 selects 3xCLK to be driven out of output terminal 356. This clock signal is used by interface circuitry 327 within DIP 316 to latch in data received on input terminals 349. During a blanking period when no pixel information is being output from the AFE/TG integrated circuits, the AFE/TG integrated circuits drive digital zeros onto their output terminals DOUT[15:11]. The AFE/TG integrated circuits output the start of frame (SOF) signal and the valid pixel (VPIX) signal in standard fashion as illustrated in FIG. 21 in DCLK periods 1-13. When VPIX goes high, then AFE/TG 313 outputs a first five bits of a multi-bit pixel value for red. A sixteen-bit pixel value DOUT[15:0] for red is supplied to interface circuitry 321 within AFE/TG 313. The least significant bit DOUT[15] is dropped (omitted), and the remaining fifteen bits are sectioned up into three five-bit subsets. The three subsets are supplied to 3:1 multiplexer 360. Multiplexer 360 is controlled so that in 3xDCLK period 14-15 multiplexer 360 selects subset DOUT[14:10], in 3xDCLK period 16-17 multiplexer 360 selects subset DOUT[9:5], and in 3xDCLK period 18-19 multiplexer 360 selects subset DOUT[4:0]. The selected five DOUT bits are conducted to five corresponding output drivers 361, onto five output terminals 348, across five corresponding point-to-point connections 347, and to five corresponding input terminals 349 of DIP 316. The five bits are supplied to the data inputs of each of three five-bit registers 332-334. Write enable controller 331, which is clocked by the 3xDCLK clock signal driven by AFE/TG 313, enables only register 332. Accordingly, the first five-bit subset of the fifteen-bit red pixel value is captured in register 332 on the falling edge of 3xDCLK. Next, in 3xDCLK period 16-17, the multiplexer 360 within bus controller 324 of AFE/TG 313 is controlled so that the next five-bit subset of the fifteen-bit red pixel value is driven out of AFE/TG 313 onto point-to-point connections 347. Write enable controller 331 within DIP 316 this time enables five-bit register 333 so that register 333 clocks in the next five-bit subset. Next, in 3xDCLK period 18-19, the multiplexer 360 within bus controller 324 of AFE/TG 313 is controlled so that the third five-bit subset of the fifteen-bit red pixel value is driven out of AFE/TG 313 onto point-to-point connections 347. Write enable controller 331 within DIP 316 this time enables five-bit register 334 so that register 334 clocks in the last five-bit subset. Multiplexer 344 is controlled to select the upper sixteen-bit set of input leads (the fifteen bits from registers 332-334 as well as the least significant bit which is designated "0" on the upper data input lead of multiplexer 344 in FIG. 20. The resulting red pixel value is output onto a sixteen-bit bus as R[14:0],0.

As illustrated in the waveform of FIG. 21, each of AFE/TG integrated circuits 313-315 outputs five bit values across point-to-point connections at the same time. As illustrated in FIG. 20, AFE/TG integrated circuit 314 outputs from its terminals DOUT[15:11] to terminals DIN[9:5] of DIP 316. AFE/TG integrated circuit 315 outputs from its terminals DOUT[15:11] to terminals DIN[4:0] of DIP 316. Every third 3xDCLK cycle, a new fifteen-bit red, a new fifteen-bit green, and a new fifteen-bit blue value is output from the interface circuit 327 within DIP 316. In FIG. 21, the waveforms labeled DIN[14:10], DIN[9:5] and DIN[4:0] at the bottom of the diagram represent the five bit values being received on the input terminals of DIP 316. "DL" designates the low five bits of a pixel value, the "DM" designates the middle five bits of the pixel value, and the "DH" designates the high five bits of the pixel value. The bus enable generator within the interface circuitry of an AFE/TG generates the appropriate enable signal that enables the five output drivers that drive the AFE/TG's output terminals DOUT[15:11]. A delay locked loop (DLL) within the bus enable generator is locked to the clock signal 1xDCLK (DCLK) such that the resulting enable signal enables the output drivers a controlled amount of setup time before the rising edge of the clock signal DCLK occurs. The falling edge of 3xDCLK is used to clock the DOUT value into DIP 316. The drivers of the remaining eleven terminals DOUT[10:0] are disabled to reduce power consumption. In the "Bit Slice 3 AFE Mode", the output drivers 361 are enabled and left enabled throughout 3xDCLK periods 14-31. Because there is only one output driver driving each of the cable connections, and because the output drivers are enabled and left enabled, there is no bus contention issue that might otherwise slow data transmission across the five conductor cable during 3xDCLK periods 14-31. Because there is only one output driver on each cable connection to the DIP 316, the output driver can be made smaller and can be made to drive a smaller amount of drive current. Power consumption is therefore reduced in comparison with the time multiplexing scheme described above. Because the connections between five output terminals of the AFE/TG and the DIP are point-to-point connections, these connections can be made to have less capacitive loading (for example, less than 30 pF as compared with 90 pF for the time multiplexing scheme described above). Less expensive cabling (for example, ribbon cable or flex circuit) can be employed where increases in data transmission speed are not as important as reduced system cost.

Figure 22:
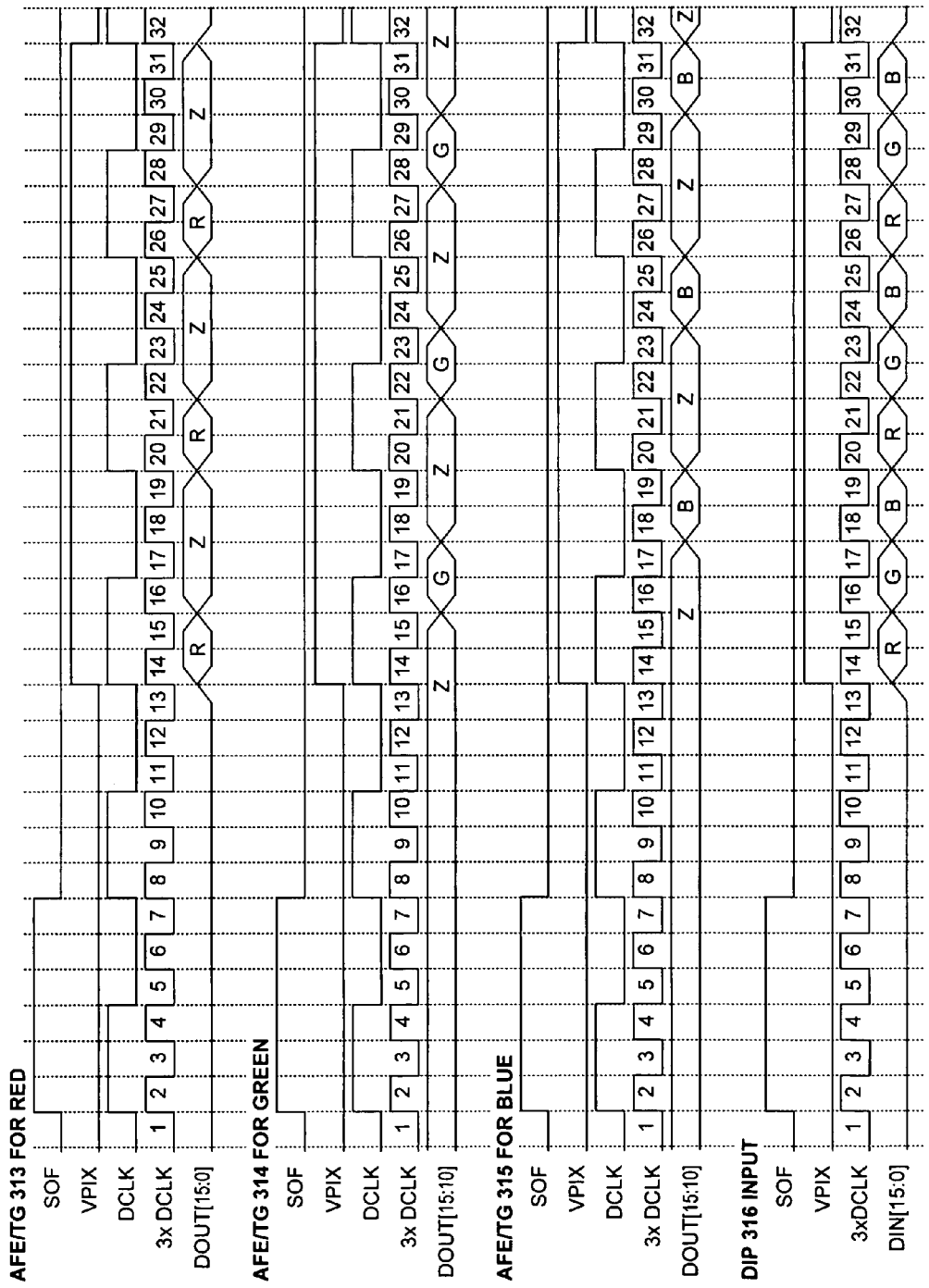
FIG. 22 is a waveform diagram that illustrates an alternative time slice (time multiplexing) operation of the AFE/TG integrated circuit. In a time slice operation involving three AFE/TG integrated circuits, the interface circuitry within the AFE/TGs take turns in driving parallel pixel information onto a single parallel bus that extends to the DIP. Interface circuitry with the DIP clocks the parallel pixel information from the first AFE/TG into a first register, then clocks the parallel pixel information from the second AFE/TG into a second register, and then clocks the parallel pixel information from the third AFE/TG into a third register.

The AFE/TG integrated circuit described above does not, however, have to be used in the "Bit Slice 3 AFE Mode." FIG. 22, for example, illustrates operation of a system wherein three identical AFE/TG integrated circuits are used to communicate information to a DIP in a time multiplexing manner. Such a situation may arise, for example, where the DIP employed does not have the novel interface circuitry 327 illustrated in FIG. 20 that collects successive five-bit subsets of a pixel value, reassembles the five-bit subsets into a longer fifteen-bit pixel value, and then supplies the longer fifteen-bit pixel value in parallel to the remainder of the DIP circuitry.

In the example of FIG. 22, each of three identical AFE/TG integrated circuits of the type illustrated in FIG. 20 is coupled to a single DIP. The sixteen data output terminals DOUT[15:0] of the first AFE/TG are coupled to the sixteen data input terminals DIN[15:0] of the DIP, as are the sixteen output terminals DOUT[15:0] of the second AFE/TG and as are the sixteen output terminals DOUT[15:0] of the third AFE/TG. Accordingly, each data input terminal of the DIP is coupled to three AFE/TG output drivers. Each of these connections is a multi-branch connection that extends across multiple ribbon cables or flex circuits.

Initially, the processor of the DIP (not shown) writes mode control information into the mode control registers of the AFE/TG integrated circuits via serial bus 359. The mode control information in the first AFE/TG controls the first AFE/TG to be a master. The mode control information in the second and third AFE/TG integrated circuits controls these AFE/TGs to be slaves. As illustrated in FIG. 23, the master/slave bit for the first AFE/TG is a "1" and the four remaining mode control bits are "0111". As illustrated in FIG. 23, the master/slave bit for the second and third AFE/TGs is a "0" and the four remaining mode control bits are "0011".

Once the mode control registers are loaded with the appropriate values, operation proceeds as illustrated in the time multiplexing waveforms of FIG. 22. During the blanking period of 3xDCLK periods 1-13, the master AFE/TG drives the sixteen DIN[15:0] input terminals of the DIP with a digital low ("0"). The start of frame (SOF) and valid pixel (VPIX) signals are driven in standard fashion. The bus controller in each AFE/TG counts the number of 3xDCLK periods that have elapsed. In 3xDCLK period 14-15, the AFE/TG that is loaded with configuration information to be the master drives the sixteen-bit bus with a sixteen-bit red pixel information value. Five of the bits are output via five output terminals 348 (first plurality of terminals), whereas the remaining eleven of the bits are output via terminals 363 (second plurality of terminals). The sixteen-bit value output is indicated in FIG. 22 with a "R" in the waveform DOUT[15:0] for AFE/TG 313. The other two AFE/TG integrated circuits that are slaves do not drive the sixteen-bit bus during this time. The sixteen-bit red pixel information value therefore appears on the sixteen input terminals DIN[15:0] of the DIP. This is illustrated in the waveform labeled DIN[15:0] at the bottom of FIG. 22. In the next 3xDCLK period 16-17, the bus controller of the master AFE/TG controls its output drivers driving terminals 348 and 363 to tri-state themselves from the bus. The bus controller within the first slave AFE/TG, however, enables its sixteen output drivers so that a sixteen-bit green pixel value "G" is driven across the bus in parallel fashion to the sixteen input terminals DIN[15:0] of the DIP. The third slave AFE/TG does not drive the bus during this 3xDCLK period. The AFE/TG is configured to be either the first slave or the second slave by additional mode information (a slave number) that is written into the mode control registers of the AFE/TGs by the processor at initialization time. This additional information is supplied via lines 362 to the bus enable generator 323 so that the bus enable generator 323 of the first slave AFE/TG will drive the bus in one 3xDCLK period (for example, 3xDCLK period 16-17), whereas the second slave AFE/TG will drive the bus in the next 3xDCLK period (for example, 3xDCLK period 18-19). A slave AFE/TG determines when to drive the bus by using a combination of its preprogrammed slave number and the number of the current 3xDCLK period. The master and slave AFE/TGs are synchronized with respect to one another due to their all being clocked by the same source clock.

The arrival of the sixteen bits of green pixel information output by the first slave AFE/TG is illustrated by the "G" at period 16-17 in the waveforms of FIG. 22. Within DIP 316, the interface circuitry 327, which has been configured to be in the "Time Slice 3 AFE Mode" by the processor, receives the full sixteen-bit value "G" from the bus onto its input terminals DIN[15:0]. This sixteen-bit value "G" is supplied onto the data input leads of each of the three sixteen-bit registers 341-343. The write enable controller 331 of the DIP, however, only enables one of the registers at a time. In 3xDCLK period 14-15, the register 341 for red is enabled. In 3xDCLK period 16-17, the register 342 for green is enabled. In 3xDCLK period 18-19, the register 343 for blue is enabled. This process continues such that one sixteen-bit pixel value is received onto input terminals DIN[15:0] of the DIP each 3xDCLK period and such that the sixteen-bit value is clocked into the appropriate sixteen-bit register. The multiplexers 344-346 are selected such that the sixteen-bit outputs of the sixteen-bit registers 341-343 are coupled onto the red, green and blue sixteen-bit output buses.

It is therefore seen that the AFE/TG integrated circuit is versatile in that it can be used in either the bit slice mode or the time slice (time multiplexing) mode. The AFE/TG has a single image sensor mode, a dual image sensor mode, and a triple image sensor mode (described above as the 3 CCD mode). In the same way that the AFE/TG has these modes, so too does the DIP integrated circuit have the same modes. Interface circuitry 327 within the DIP allows the DIP to operate in a camera having one image sensor and AFE/TG, in a camera having two image sensors and AFE/TGs, or in a camera having three image sensors and AFE/TGs.

In one embodiment, the polarity of the clock signal, and whether the clock signal output onto terminal 356 is 1xDCLK, 2xDCLK or 3xDCLK is configurable by writing corresponding bits into the mode control register 326. The DLL within the bus enable generator 323 allows the time delay between clock signal output onto terminal 356 to be adjusted with respect to the time that the data is output onto terminals 348 and 363 and the time that the associated output buffers drive terminals 348 and 363. The time delay can be set to one of 64 time delays. Multiplexer 322 and the test signal TEST are provided so that in a debug mode the output buffer drive signal output by the bus enable generator 323 can be driven out of the AFE/TG integrated circuit and examined.

The attached "Paper Appendix" is a hardware description (written in Verilog hardware description language) of another specific embodiment of an interface circuit within an AFE/TG in accordance with a novel aspect. The interface circuit is configurable to operate in one of a time slice mode (dual image sensor or triple image sensor), or a bit slice mode (dual image sensor or triple image sensor), or a single image sensor mode. A schematic of the circuit described by the Verilog code can be created using Verilog viewing software.

Although the present invention has been described in connection with certain specific embodiments for instructional purposes, the present invention is not limited thereto. The AFE/TG circuitry can be integrated onto the same integrated circuit with the image sensor. Although an embodiment is described where one bit of a long pixel word is truncated and the remaining bits are sectioned into subsets that are communicated across point-to-point connections, the one bit can in other embodiments be communicated to the DIP. For example, the DOUT[10] of each AFE/TG can be coupled to the same DIN[15] input terminal of the DIP. The multiple AFE/TGs can take turns driving their respective one bits (their bit that would otherwise be truncated) onto the DIN[15] terminal in a time multiplexing manner, even though the remaining bits are being communicated in a bit slice mode. Differential signaling techniques can be employed to communicate pixel information from the AFE/TG to the DIP. The communication of pixel information between the AFE/TG and the DIP needed not involve parallel communication, but rather the pixel information can be communicated from an AFE/TGs to the DIP using a Serializer/Deserializer (SerDes) transceiver on the AFE/TG and a SerDes transceiver on the DIP. Suitable SerDes transceivers are known in the art and are used to communicate data from memories (see, for example, U.S. Pat. No. 6,775,328 and published U.S. Patent Application Number 2005/0012524, the subject matter of these patent documents is incorporated herein by reference). For general information on SerDes transceiver design, see the book entitled "Handbook of Digital Techniques for High-Speed Design," by Tom Granberg, Prentice Hall Modern Semiconductor Design Series, 928 pages, 2004 (the subject matter of this text is incorporated herein by reference).

Accordingly, various modifications, adaptations, and combinations of various features of the described embodiments can be practiced without departing from the scope of the invention as set forth in the claims.

PAPER APPENDIX

```
/**********************************************************************
*       The following listing is a hardware description (written in
*       Verilog hardware description language) of one specific
*       embodiment of an interface circuit within a novel AFG/TG,
*       where the interface circuit allows the AFG/TG to send
*       pixel information to DIP integrated circuit in a selectable
*       one of a time slice mode or a bit slice mode.
* Module Name: dout_ctl
* Description: dout_ctl block module
**********************************************************************/
module dout_ctl (
DEBUG_CTL,
CLKx1,
CLKxN,
RESETN,
DIN,
HS,
VPIX_IN,
SOF_IN,
BUS_EN_FR_DLL,
BUS_EN_POL,
BUS_EN_MONI_ON_VPIX,   // BUS_EN monitor on VPIX
TIME_SLICE_ON,
BIT_SLICE_ON,
MASTER_SLAVE,
TRI_AFE,
DOUT,
VPIX_OUT,
SOF_OUT,
DOUT_BUF_EN,
GREY_ON
);
input    [15:0]   DEBUG_CTL;           // <--- Debug control
input             CLKx1;               // <--- Clock in
input             CLKxN;               // <--- N x Clock in
input             RESETN;              // <--- reset
input    [15:0]   DIN;                 // <-16- Data in
input             HS;                  // <--- Horizontal Sync
input             VPIX_IN;             // <--- data valid pix
input             SOF_IN;              // <--- sof pix
input             BUS_EN_FR_DLL;       // <--- Bus Enable from DLL
input             BUS_EN_POL;          // <--- Bus Enable polarity
input             BUS_EN_MONI_ON_VPIX; // BUS_EN monitor on VPIX
input             TIME_SLICE_ON;       // <--- Time slice mode on
input             BIT_SLICE_ON;        // <--- bit slice mode on
input             MASTER_SLAVE;        // <--- 0: master, 1: slave
input             TRI_AFE;             // <-1- 0: 1 or 2 AFE, 1:3AFE
output   [15:0]   DOUT;                // -16-> Data final output
output            VPIX_OUT;            // ---> Valid pix output
output            SOF_OUT;             // ---> sof output
output            DOUT_BUF_EN;         // ---> Dout I/O Buffer enable
input             GREY_ON;             // <--- Grey code on
//===========================================================
// Debug control
//===========================================================
wire    frc_o_H = (DEBUG_CTL[13:12] == 2'b01);    //
wire    frc_o_L = (DEBUG_CTL[13:12] == 2'b10);    //
wire    frc_o_Z = (DEBUG_CTL[13:12] == 2'b11);    //
wire    frc_2B_o = frc_o_H | frc_o_L;
```

-continued

PAPER APPENDIX

```
//--------------------------------
// SOF (Start of Frame)
//--------------------------------
reg sof_CLKxN;
reg sof_CLKx1;
always @ (posedge CLKxN or negedge RESETN)
if(!RESETN)
      sof_CLKxN <= #1 0;
else
      sof_CLKxN <= #1 SOF_IN;
always @ (posedge CLKx1 or negedge RESETN)
if(!RESETN)
      sof_CLKx1 <= #1 0;
else
      if(frc_o_H)
            sof_CLKx1 <= #1 1'b1;
      else
            if(frc_o_L)
                  sof_CLKx1 <= #1 1'b0;
            else
                  sof_CLKx1 <= #1 SOF_IN;
//---------------------------
// VPIX
//---------------------------
reg vpix_CLKxN;
reg vpix_CLKx1;
always @ (posedge CLKxN or negedge RESETN)
if(!RESETN)
      vpix_CLKxN <= #1 0;
else
      vpix_CLKxN <= #1 VPIX_IN;
always @ (posedge CLKx1 or negedge RESETN)
if(!RESETN)
      vpix_CLKx1 <= #1 0;
else
      if(frc_o_H)
            vpix_CLKx1 <= #1 1'b1;
      else
            if(frc_o_L)
                  vpix_CLKx1 <= #1 1'b0;
            else
                  vpix_CLKx1 <= #1 VPIX_IN;
//---------------------------
// Making Time slot ID
//---------------------------
reg[1:0]   bit_slice_cnt;
always @ (posedge CLKxN or negedge RESETN)
if(!RESETN)
      bit_slice_cnt <= #1 0;
else
      if(!vpix_CLKxN)
            bit_slice_cnt <= #1 0;
      else
         if((TRI_AFE & bit_slice_cnt==2) || (!TRI_AFE & bit_slice_cnt==1))
               bit_slice_cnt <= #1 0;
            else
               bit_slice_cnt <= #1 bit_slice_cnt + 1;
//---------------------------
// Delayed DOUT by CLKxN
//---------------------------
reg [15:0]   DIN_CLKxN;
always @ (posedge CLKxN or negedge RESETN)
if(!RESETN)
      DIN_CLKxN <= #1 0;
else
      DIN_CLKxN <= #1 DIN;
//---------------------------
// Control time slot for data bus
//---------------------------
reg [7:0]    dout_t_upper;
reg          vpix_CLKxN_dl;
always @ (posedge CLKxN or negedge RESETN)
if(!RESETN)
      begin
      dout_t_upper <= #1 0;
      end
else
```

-continued

PAPER APPENDIX

```
        //if(BIT_SLICE_ON & vpix_CLKxN)
        if(BIT_SLICE_ON & vpix_CLKxN )
            begin
                if(TRI_AFE == 0)
                    case(bit_slice_cnt)
                        0:           dout_t_upper <= #1 DIN_CLKxN[7:0];
                        1:           dout_t_upper <= #1 DIN_CLKxN[15:8];
                        default:     dout_t_upper <= #1 0;
                    endcase
                else
                    case(bit_slice_cnt)
                        0:           dout_t_upper <= #1 {DIN_CLKxN[5:1], 3'h0};
                        1:           dout_t_upper <= #1 {DIN_CLKxN[10:6], 3'h0};
                        2:           dout_t_upper <= #1 {DIN_CLKxN[15:11], 3'h0};
                        default:     dout_t_upper <= #1 0;
                    endcase
            end
        else
            begin
                dout_t_upper <= #1 0;
            end
always @ (posedge CLKxN or negedge RESETN)
if(!RESETN)
        vpix_CLKxN_dl <= #1 0;
else
        vpix_CLKxN_dl <= #1 vpix_CLKxN;
//---------------------------
// Binary to Grey Code Selector
//---------------------------
wire[15:0]  greyed_dout;
reg[15:0]   DOUT_CLKx1;
assign greyed_dout = grey( (GREY_ON) ? DIN : 0);
always @ (posedge CLKx1 or negedge RESETN)
if(!RESETN)
        DOUT_CLKx1 <= #1 0;
else
    if(frc_o_H)
        DOUT_CLKx1 <= #1 16'hffff;
    else
        if(frc_o_L)
            DOUT_CLKx1 <= #1 16'h0000;
        else
            if(~VPIX_IN)
                DOUT_CLKx1 <= #1 0;
            else
                DOUT_CLKX1 <= #1 (GREY_ON) ? greyed_dout : DIN;
//---------------------------
// Binary to Grey Code Selector
//---------------------------
  function [15:0] grey;
    input [15:0] bin;
    begin
        grey[15] = bin[15];
        grey[14] = bin[15]^bin[14];
        grey[13] = bin[14]^bin[13];
        grey[12] = bin[13]^bin[12];
        grey[11] = bin[12]^bin[11];
        grey[10] = bin[11]^bin[10];
        grey[9] = bin[10]^bin[9];
        grey[8] = bin[9]^bin[8];
        grey[7] = bin[8]^bin[7];
        grey[6] = bin[7]^bin[6];
        grey[5] = bin[6]^bin[5];
        grey[4] = bin[5]^bin[4];
        grey[3] = bin[4]^bin[3];
        grey[2] = bin[3]^bin[2];
        grey[1] = bin[2]^bin[1];
        grey[0] = bin[1]^bin[0];
    end
endfunction
//---------------------------
// Output Selector
//---------------------------
assign    DOUT     = (BIT_SLICE_ON)?  {dout_t_upper,8'h0}  :   DOUT_CLKx1;
assign    VPIX_OUT      =   (BUS_EN_MONI_ON_VPIX)?
                            DOUT_BUF_EN :
                              (BIT_SLICE_ON)? vpix_CLKxN_dl : vpix_CLKx1;
```

-continued

PAPER APPENDIX

```
assign  SOF_OUT     = (BIT_SLICE_ON)? sof_CLKxN : sof_CLKx1;
assign  DOUT_BUF_EN = (frc_o_Z) ?
                         1'b1
                         : (TIME_SLICE_ON)?
                             (vpix_CLKx1)?
                                 (BUS_EN_POL^BUS_EN_FR_DLL)
                                 :  (MASTER_SLAVE) ?
                                       1'b1
                                       : 1'b0
                             :
                             1'b0;
endmodule
```

What is claimed is:

1. A timing generator integrated circuit that receives pixel information from an image sensor and is operable in a selectable one of a first mode and a second mode, the integrated circuit comprising:

a first plurality of terminals, wherein in the first mode a first subset of bits of a first single-color-component multi-bit pixel value is output onto the first plurality of terminals in parallel at a first time, a second subset of the bits of the first single-color component multi-bit pixel value is output onto the first plurality of terminals in parallel at a second time, and a third subset of the bits of the first single-color component multi-bit pixel value is output onto the first plurality of terminals in parallel at a third time; and a second plurality of terminals, wherein in the second mode a second multi-bit pixel value is output in parallel from the integrated circuit such that a first plurality of bits of the second multi-bit pixel value is output onto the first plurality of terminals at the same time that a second plurality of the bits of the second multi-bit pixel value is output onto the second plurality of terminals, wherein the second plurality of terminals is disabled in the first mode, wherein the timing generator integrated circuit is one of three identical timing generator integrated circuits within an electronic device, and wherein each of the three timing generator integrated circuits outputs pixel values for a different color.

2. The timing generator integrated circuit of claim 1, wherein the timing generator integrated circuit only operates in the first mode.

3. The timing generator integrated circuit of claim 1, wherein the first single-color component multi-bit pixel value consists of a first number of bits, wherein the second multi-bit pixel value consists of a second number of bits, wherein the first number and the second number are not equal.

4. The timing generator integrated circuit of claim 1, wherein the first single-color component multi-bit pixel value consists of a first number of bits, wherein the second multi-bit pixel value consists of a second number of bits, wherein the first number and the second number are equal.

5. The timing generator integrated circuit of claim 1, further comprising:

a register that stores mode control information, the mode control information determining whether the timing generator integrated circuit is in the first mode or is in the second mode.

6. A method of outputting pixel information from an timing generator integrated circuit, the integrated circuit having a first plurality of terminals and a second plurality of terminals, the method comprising:

in a first mode outputting at least part of a first single-color component multi-bit pixel value by outputting a first subset of bits of the first single-color component multi-bit pixel value onto the first plurality of terminals at a first time and then outputting a second subset of the bits of the first single-color component multi-bit value onto the first plurality of terminals at a second time and then outputting a third subset of the bits of the first single-color component multi-bit value onto the first plurality of terminals at a third time, wherein the second plurality of terminals is disabled in the first mode; and in a second mode outputting a second multi-bit pixel value by outputting a first plurality of bits of the second multi-bit pixel value onto the first plurality of terminals at the same time that a second plurality of the bits of the second multi-bit pixel value is output onto the second plurality of terminals, the integrated circuit being operable in a selectable one of the first mode and the second mode, wherein the timing generator integrated circuit is one of three identical timing generator integrated circuits within an electronic device, and wherein each of the three timing generator integrated circuits outputs pixel values for a different color.

7. The method of claim 6, wherein the integrated circuit only operates in the first mode.

8. The method of claim 6, wherein the timing generator integrated circuit is coupled to a second integrated circuit, wherein each of the first plurality of terminals of the timing generator integrated circuit is coupled to a corresponding one of a plurality of terminals of the second integrated circuit by a dedicated connection.

9. A system comprising:

a first integrated circuit having a first plurality of terminals and a second plurality of terminals;

a second integrated circuit having a plurality of terminals, wherein each of the terminals of the second integrated circuit is coupled to a corresponding one of the first plurality of terminals of the first integrated circuit, the second integrated circuit outputting at least part of a first single-color multi-bit pixel value by outputting successive subsets of bits of the first single-color multi-bit pixel value onto the terminals of the second integrated circuit; and a third integrated circuit having a plurality of terminals, wherein each of the terminals of the third integrated circuit is coupled to a corresponding one of the second plurality of terminals of the first integrated circuit, the third integrated circuit outputting at least part of a second single-color multi-bit pixel value by outputting successive subsets of bits of the second single-color multi-bit pixel value onto the terminals of the third integrated circuit, wherein said at least part of the first single-color multi-bit pixel value is communicated from the second integrated circuit to the first integrated circuit at substantially the same time that said at least part of the second single-color multi-bit pixel value is communicated from the third integrated circuit to the first integrated circuit, the third integrated circuit being substantially identical to the second integrated circuit, wherein the second integrated circuit stores mode control information that determines whether the second integrated circuit operates in a single image sensor mode or in a multi-image sensor mode, and wherein the third integrated circuit stores mode control information that determines whether the third integrated circuit operates in a single image sensor mode or in a multi-image sensor mode.

10. The system of claim 9, wherein each of the terminals of the second integrated circuit is coupled to a corresponding one of the first plurality of terminals of the first integrated circuit by a dedicated connection, no integrated circuit other than the first integrated circuit and the second integrated circuit being coupled to the dedicated connection.

11. The system of claim 10, wherein the first plurality of terminals of the first integrated circuit is coupled to the terminals of the second integrated circuit by a first multi-conductor flexible cable, and wherein the second plurality of terminals of the first integrated circuit is coupled to the terminals of the third integrated circuit by a second multi-conductor flexible cable.

12. The system of claim 9, wherein the system is a camera, the camera comprising:
   a first image sensor that supplies pixel information to the second integrated circuit; and
   a second image sensor that supplies pixel information to the third integrated circuit.

13. A method of outputting pixel information from a timing generator integrated circuit, the timing generator integrated circuit having a first plurality of terminals and a second plurality of terminals, the method comprising:

in a first mode outputting at least part of a first multi-bit pixel value by outputting a first subset of bits of the first multi-bit pixel value onto the first plurality of terminals at a first time and then outputting a second subset of the bits of the first multi-bit pixel value onto the first plurality of terminals at a second time and then outputting a third subset of the bits of the first multi-bit pixel value onto the first plurality of terminals at a third time, wherein the second plurality of terminals is disabled in the first mode, wherein the timing generator integrated circuit is one of three identical timing generator integrated circuits within an electronic device, and wherein each of the three timing generator integrated circuits outputs pixel values for a different color.

14. The method of claim 13, wherein the timing generator integrated circuit is also operable in a second mode, wherein in the second mode the timing generator integrated circuit outputs a second multi-bit pixel value by outputting a first plurality of bits of the second multi-bit pixel value onto the first plurality of terminals at the same time that a second plurality of the bits of the second multi-bit pixel value is output onto the second plurality of terminals.

15. The method of claim 14, wherein the first multi-bit pixel value is a sixteen-bit value, the first subset of bits consists of five bits, the second subset of bits consists of five bits, and the third subset of bits consists of five bits, and wherein the second multi-bit pixel value is a sixteen-bit value, the second multi-bit pixel value consisting of the first plurality of bits of the second multi-bit pixel value and the second plurality of bits of the second multi-bit pixel value.

16. The method of claim 14, wherein the first multi-bit pixel value consists of a first number of bits, wherein the second multi-bit pixel value consists of a second number of bits, wherein the first number and the second number are not equal.

17. The method of claim 14, wherein the first multi-bit pixel value consists of a first number of bits, wherein the second multi-bit pixel value consists of a second number of bits, wherein the first number and the second number are equal.

* * * * *